US005724044A

United States Patent [19]

Tanaka

[11] Patent Number: 5,724,044

[45] Date of Patent: Mar. 3, 1998

[54] ELECTRICALLY SCANNING MICROWAVE RADIOMETER

[75] Inventor: Hirokazu Tanaka, Kamakura, Japan

[73] Assignee: Mitsubishi Denki Kabushiki Kaisha, Tokyo, Japan

[21] Appl. No.: 791,012

[22] Filed: Jan. 27, 1997

Related U.S. Application Data

[63] Continuation of Ser. No. 370,536, Jan. 9, 1995, abandoned.

[30] Foreign Application Priority Data

Jan. 10, 1994 [JP] Japan .................................... 6-000780

[51] Int. Cl.$^6$ ............................. G01S 3/02; H01Q 3/22; H04B 7/185

[52] U.S. Cl. ........................... 342/351; 342/354; 342/371

[58] Field of Search .................................... 342/351, 354, 342/371, 372

[56] References Cited

U.S. PATENT DOCUMENTS

| | | | |
|---|---|---|---|
| 4,718,100 | 1/1988 | Levis | 342/351 |
| 4,724,439 | 2/1988 | Wiley et al. | 342/351 |
| 4,978,962 | 12/1990 | Hisada et al. | 342/351 |
| 5,276,451 | 1/1994 | Schuss et al. | 342/371 |

*Primary Examiner*—Gregory C. Issing
*Attorney, Agent, or Firm*—Wolf, Greenfield & Sacks, P.C.

[57] ABSTRACT

An electrically scanning microwave radiometer (ESMR) is mounted in a flying body orbiting a planet and operative to measure the surface of the planet. A receiving antenna having its cylindrical or multiplicated radiation face is used to scan the surface of the planet along a conical section. A receiver detects the radiation from the planet which is received by the receiving antenna. The detected signals are then integrated by an integrator. The integrated value is converted into a digital value by a signal processor. The digital value is transmitted to an earth station as a measurement signal after it has been formatted. The receiving antenna may be either of a cylindrical phased-array antenna or multiplicated phased-array antenna. The cylindrical and multiplicated faces may be replaced by inverse-directional cylindrical and multiplicated faces, respectively. Further, the receiving antenna may be of a composite or multi-beam type which includes any combination of the aforementioned surfaces. Since the surface of the planet is scanned along the conical section, the incident angle will not be changed even if the width of beam scan is increased. This enables variable incident angle type, multiple polarization type and multiple frequency type ESMRs to be accomplished.

58 Claims, 26 Drawing Sheets

ELECTRICALLY SCANNING MICROWAVE RADIOMETER

This application is a continuation of application Ser. No. 08/370,536, filed Jan. 9, 1995 now abandoned.

BACKGROUND OF THE INVENTION a) Field of the Invention

The present invention relates to an electrically scanning microwave radiometer (ESMR) mounted in a flying body such as an artificial satellite or planetary probe to measure the surfaces of the earth or other planets for such a purpose as resource surveying, meteorological measurement etc.

b) Description of the Prior Art

FIG. 25 shows the layout of an ESMR which is disclosed as in U.S. Pat. No. 4,978,962. The ESMR is mounted in an artificial satellite and used to measure the surface of the earth.

The ESMR comprises a planar array type receiving antenna 1 which is formed by a plurality (m in number) of slotted-waveguide arrays 1*a*–1*m*. Microwave noise radiation from objects to be measured on the earth's surface is received by the receiving antenna 1. The temperature $T_A$ of the receiving antenna 1 at this time can be represented by:

$$T_A = 1/4\pi) \int\int_{4\pi} G(\Omega)T_B(\Omega)d\Omega \qquad (1)$$

where G(Ω) is the gain function of the receiving antenna 1; $T_B(\Omega)$ is the brightness temperature of the objects to be measured; and Ω is the solid angle.

Each of variable phase shifters 2*a*–2*m* is provided to the respective one of the slotted-waveguide arrays 1*a*–1*m*. These variable phase shifters 2*a*–2*m* form a phase shifting circuit 2. The phase of a signal received by each of the slotted-waveguide arrays 1*a*–1*m* is shifted by the corresponding one of the variable phase shifters 2*a*–2*m*. The amount of phase shift by each of the variable phase shifters 2*a*–2*m* is controlled by a phase-shift controller 3. The phase-shift controller 3 electronically steers the beam of the receiving antenna 1 by controlling the phase shift in each of the variable phase shifters 2*a*–2*m*. The phase-shift control is executed such that the surface of the earth or other planet is raster scanned by the beam of the receiving antenna 1 as shown in FIG. 26.

The post-stage of the variable phase shifters 2*a*–2*m* includes a low noise receiver 4 for low-noise amplifying and detecting received signals subjected to phase shift through the variable phase shifters 2*a*–2*m* and for sending the processed signals to an integrator 5. The integrator 5 integrates and sends the received signals to a signal processor 6. The signal processor 6 converts the integrated signals from analog form into digital form. The converted signal is then formatted and sent to a transmitter (not shown) by the signal processor 6. The transmitter transmits the formatted signal to an earth station as a measurement signal indicating a result of measurement. The earth ground station receives and processes the measurement signal through a given image processing process to form and display a map of measured brightness on the ground surface.

The measurement signal formed by the ESMR indicates an average value of brightness temperatures on objects to be measured within the beam width of the receiving antenna 1 (see FIG. 27). The temperature resolution ΔT representing the receiving sensitivity of the ESMR is represented by the following formula:

$$\Delta T = K(T_A + T_R)/(B\tau)^{1/2} \qquad (2)$$

where K is a constant determined by the low noise receiver 4; $T_A$ is an antenna temperature determined by the formula (1); $T_R$ is the receiver noise temperature of the low noise receiver 4; B is the bandwidth of the low noise receiver 4; and τ is an integration time in the integrator 5. As will be apparent from the formula (2), the temperature resolution ΔT of the ESMR can be reduced as the integration time τ is increased.

However, the integration time τ is limited by the speed of the flying body on which the ESMR is mounted and the width of beam scan in the ESMR. In general, the speed of the flying body such as an artificial satellite is single-valuedly determined by the altitude thereof. If the widths of beam and scan in the antenna 1 and set so as to execute a mapping without any blank in the direction of advance of the an artificial satellite, the speed of beam scan will naturally be determined. Thus, the integration time τ will also be determined. In other words, the integration time τ is reduced if the width of beam scan is increased. Thus, the temperature resolution ΔT will be sacrificed. It is therefore desired to provide an ESMR having improved temperature resolution.

The ESMR which is mounted in a flying body such as an artificial satellite or planetary probe to measure the surface of the earth or planet through electronic scan is not actually used world-wide except the aforementioned prior art. As shown in FIG. 27, however, the brightness temperature of the objects to be measured is variable depending on the incident angle or an angle included between the width direction of a beam in the antenna 1 and the normal direction of the objects to be measured (e.g., the radial direction of the earth). Therefore, the brightness temperature measured for the same object will apparently vary depending on the incident angle if it were varied through the beam scan of the antenna 1. The variation of the antenna temperature $T_A$ created by such an apparent alteration cannot be discriminated from the result of measurement with respect to whether it indicates the actual variation of the brightness temperature or the apparent variation of the same associated with the changed incident angle. To overcome such a problem, the ESMR of the prior art was adapted to limit the variation of the incident angle. This must limit the width of beam scan in the receiving antenna 1. It is therefore desired to provide an ESMR which will not produce any apparent variation of brightness temperature from the variation of the incident angle even if the width of beam scan is increased.

If the same object to be measured can be measured through various incident angles, various polarizations or various frequencies, various parameters can be set to provide various measurement data or to realize the multiplexing of the measurement data. However, such functions, that is, variable incidence, multi-polarization and multi-frequency have still not been accomplished until now.

Furthermore, it is required that the amount of data to be transmitted is reduced since the capacity of data transmission is limited when the measurement signals are transmitted to the earth station.

SUMMARY OF THE INVENTION

The first object of the present invention is to scan objects to be measured in a conical scan manner or along a conic section so that any variation will not be produced in the incident angle even if the width of beam scan is increased.

The second object of the present invention is to use a receiving antenna having a variable beam axis so that the incident angle is variable and thus the same area can be measured through different incident angles. The third object of the present invention is to use a receiving antenna operable through multi-polarization or frequency so that objects to be measured can be measured through the multi-polarization or frequency. The fourth object of the present invention is to improve the temperature resolution by apparently elongating the integration time along the direction of beam scan or the direction of movement of the flying body. The fifth object of the present invention is to provide a staring mechanism for observing a particular area through an increased temperature resolution. The sixth object of the present invention is to reduce the amount of data to be transmitted from the ESMR to the earth station by adding a data compression function.

In the first aspect of the present invention, there is provided an electrically scanning microwave radiometer mounted in a flying body orbiting a planet and operative to measure a surface of the planet, said electrically scanning microwave radiometer comprising a receiving antenna having a radiation face for scanning the surface of the planet along a conic section; a receiver for detecting original signals received by the receiving antenna and indicating the radiation from the planet to generate detected signals; an integrator for integrating the detected signals to generate integrated signals; and measurement signal providing means for processing the integrated signals to generate measurement signals which indicate the result of measurement for the surface of the planet and will be provided to an earth station.

According to the first aspect of the present invention, the incident angle will not vary even if the width of beam scan is increased, since the objects to be measured on the surface of the planet (the earth or an other planet) is conically scanned by the receiving antenna. Therefore, there is no problem of apparent variation in the result of measurement (e.g., brightness temperature) for the same objects to be measured. In other words, the variation of the measured antenna temperature is always the actual one since the apparent variation associated with variation of the incident angle does not occur.

In the second aspect of the present invention, there is provided a receiving antenna suitable for use in an electrically scanning mounted in a flying body orbiting a planet and operative to measure the surface of the planet, said receiving antenna comprising a plurality of sub-arrays disposed on a cylindrical surface and spaced apart from one another along a scan direction, each of said sub-arrays having at least one beam for receiving the radiation from the planet; a sub-array selection switch for selecting at least one of said sub-arrays as a receiving sub-array array, said selecting sub-array being operative to receive the radiation from the planet and to supply it to a receiver in the form of original signals; and switch control means for controlling the sub-array selection switch to select each of the sub-arrays sequentially along the scan direction as a receiving sub-array such that the surface of the planet will be scanned along the conic section.

In the third aspect of the present invention, it provides a receiving antenna suitable for use in an electrically scanning microwave radiometer mounted in a flying body orbiting a planet and operative to measure the surface of the planet, said receiving antenna comprising a plurality of sub-arrays disposed on a multiplicated surface and spaced apart from one another along a scan direction, each of said sub-arrays having at least one beam for receiving the radiation from the planet, said beam being two-dimensionally steerable both in a scan direction and a direction perpendicular to the scan direction; a sub-array selection switch for selecting at least one of said sub-arrays as a receiving sub-array, said selecting sub-array being operative to receive the radiation from the planet and to supply it to a receiver in the form of original signals; switch control means for controlling the sub-array selection switch; and beam control means for two-dimensionally steering the beam, said beam control means cooperative with said switch control means to select one of the sub-arrays sequentially along the scan direction as a receiving sub-array such that the surface of the planet will be scanned along the conic section and also to steer the beam two-dimensionally.

Thus, the receiving antenna of the present invention can be in the form of cylindrical or multiplicated face antenna. The cylindrical or multiplicated face antenna may be inversely positioned. If the speeds of switching the sub-arrays and/or two-dimensionally steering the beam are set at a level determined depending on the altitude of the flying body, the temperature and range resolutions can be optimized. If the speeds are lower than said level, the temperature resolution can be further improved. If the speeds are higher than said level, the range resolution can be further improved.

The receiving antenna of the present invention may be in the form of cylindrical phased-array or multiplicated face phased-array antenna. Each of the sub-arrays forming these phased-array antennas may be a one- or two-dimensional phased-array antenna. When the resulting cylindrical one- or two-dimensional phased-array antenna or multiplicated face one- or two-dimensional phased-array antenna is used as a receiving antenna, the beam can be scanned more precisely than the sub-array selection switch while the receiving gain can be secured. In spite of the cylindrical or multiplicated surface, a preferred isophase plane can be formed. If the cylindrical two-dimensional phased-array antenna or the multiplicated face two-dimensional phased-array antenna is used as a receiving antenna, a variable incident angle type ESMR which can measure the same area through different incident angles can be provided by steering the beam along a direction perpendicular to the scan direction.

The receiving antenna of the present invention may be in the form of multiple or multi-beam type cylindrical phased-array antenna or multiple or multi-beam type multiplicated face phased-array antenna. If these antennas are used as a receiving antenna, a plurality of areas can be simultaneously scanned. This is known as a multi-area scan. In addition, if the receiving antenna is used to scan the same area on the surface of the planet a number of times, the integration time can apparently be prolonged in the direction of orbiting to improve the temperature resolution. If the receiving antenna is used to scan the surface of the planet sequentially through a plurality of areas provided by dividing the conical curve, the integration time can apparently be prolonged in the scan direction to improve the temperature resolution. To provide these advantages, it is convenient that the receiving antenna is the multiple or multi-beam type (inverse directional) cylindrical phased-array antenna or the multiple or multi-beam type (inverse directional) multiplicated face phased-array antenna.

The receiving antenna of the present invention may be in the form of an antenna for simultaneously receiving a plurality of polarizations or frequencies in the radiation from the planet when its radiating elements are of multiple polarization or frequency type. In such a case, a polarization selector or frequency selector is provided to separate the received signals for every polarization or frequency. After such a separation, the received signals may be supplied to either of the pairs of receiver and integrator, each of which is provided for each of the polarizations or frequencies. Thus, the same objects to be measured can be measured through the multiple polarization or frequency. In addition, various measurement data can be provided from the same object to be measured by setting various parameters for the same object to be measured. In other words, the multiplexing of measurement data can be accomplished.

The present invention further comprises means for causing the receiving antenna to stare at a particular area on the surface of the planet. While staring, the scanning of the receiving antenna may be stopped or continued. Such a staring control enables the particular area to be measured with an increased temperature resolution.

The present invention further comprises means for compressing the integrated signals to overcome the limitation of transmission capacity when the measurement signals are transmitted to the earth station.

DETAILED DESCRIPTION OF THE PREFERRED EMBODIMENTS

Figure 1:
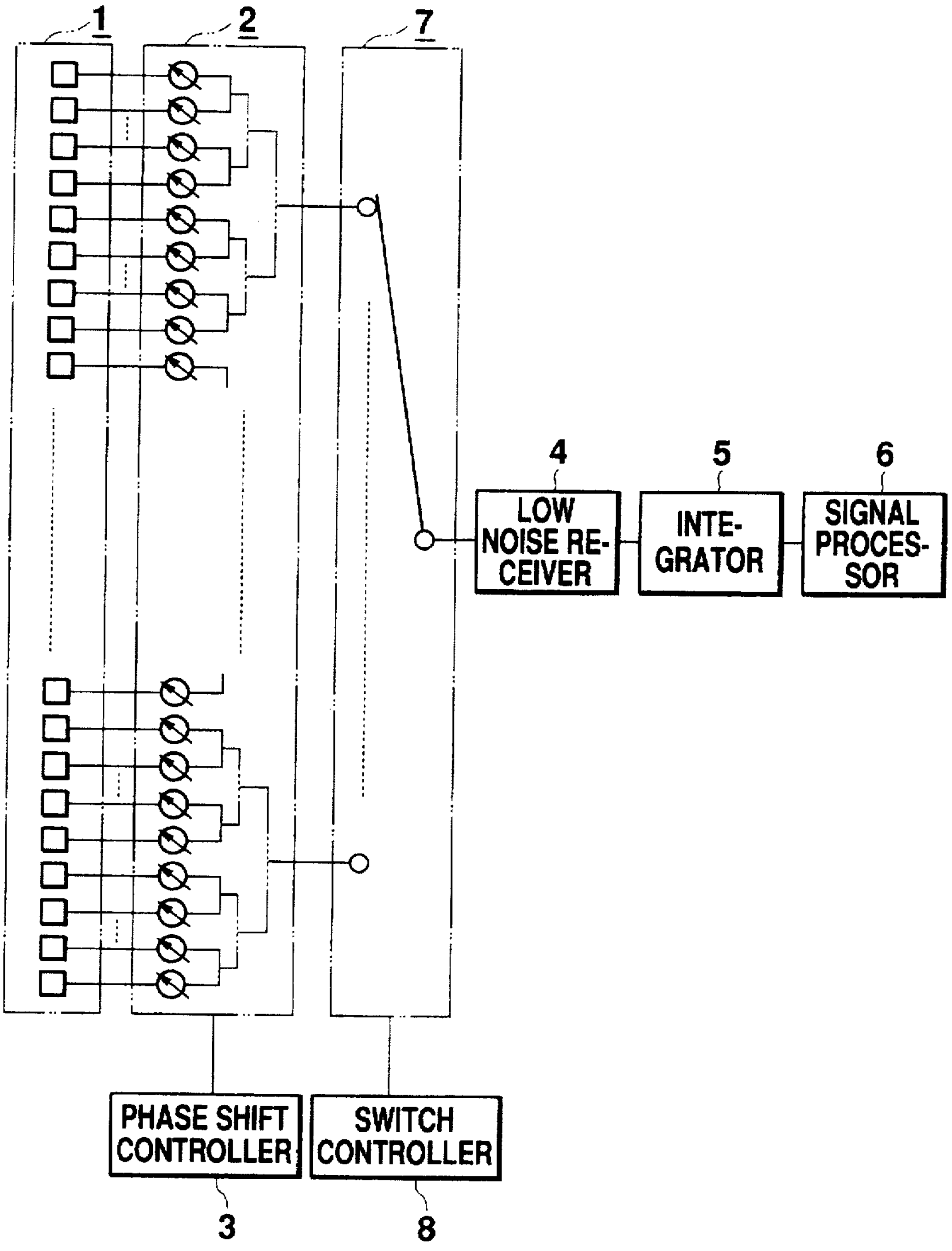
FIG. 1 is a block diagram of an ESMR which is constructed according to any one of the first, third, fourteenth, sixteenth and twenty-ninth embodiments of the present invention and which can perform a conical single-area scan.

The present invention will now be described in connection with the preferred embodiments of the present invention which are illustrated in the drawings. Throughout the drawings, similar parts are designated by similar reference numerals. The description of the similar parts will not be repeated. All the embodiments of the present invention will be described to be mounted in an orbiting body such as an artificial satellite or the like and used for measuring the surface of the earth or another planet.

First Embodiment

FIG. 1 shows the first embodiment of an ESMR constructed according to the present invention. The ESMR comprises a receiving antenna 1 which is in the form of a cylindrical one-dimensional phased-array antenna. The ESMR also comprises a sub-array selection switch 7 and a switch controller 8. As in the prior art, the ESMR further comprises a phase shifting circuit 2, a phase-shift controller 3, a low noise receiver 4, an integrator 5 and a signal processor 6.

As microwave noise is radiated from objects to be measured on the surface of the earth, it is received by the receiving antenna 1. The receiving antenna 1 comprises an array of M×N radiation elements (M and N are natural numbers) which are arranged in a matrix consisting of M columns and N rows. The radiation elements of each m columns (m is a natural number) form a sub-array. Thus, the number of radiation elements forming one sub-array is equal to m×N while the number of sub-arrays forming the receiving antenna 1 is equal to M/m (M/m is a natural number). Throughout the description, the row and column are defined to be a scan direction which will be described and a direction perpendicular to the scan direction, respectively.

Figure 2:
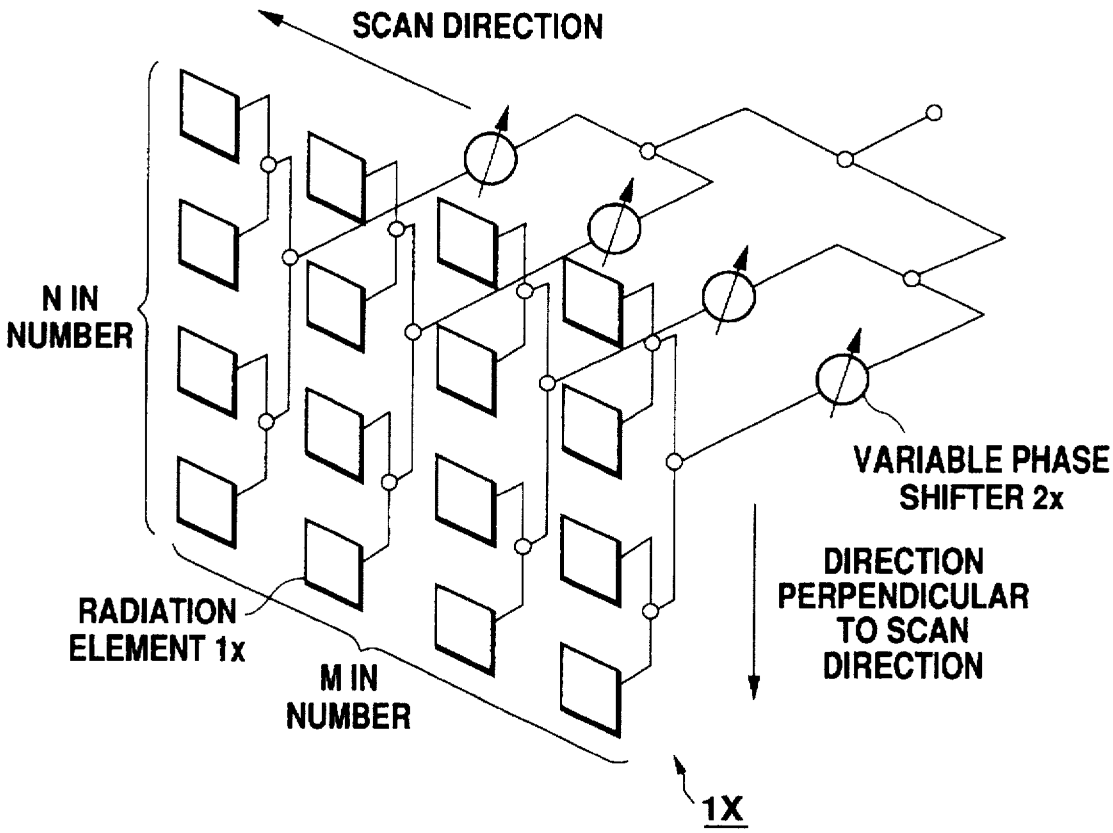
FIG. 2 is a view of the configuration of sub-arrays forming a one-dimensional phased-array antenna according to any one of the first to thirteenth and thirtieth embodiments of the present invention.

FIG. 2 shows a configuration of sub-arrays (m=4 and N=4) according to the first embodiment, in which each of the sub-arrays 1X is a one-dimensional phased-array antenna. The radiation elements 1*x* of N in number belonging to each column are connected to the respective one of the variable phase shifters 2*x* which is included in the phase shifting circuit 2. Thus, the number of variable phase shifters 2*x* for one sub-array 1X is equal to m. The received signals provided through the variable phase shifters 2*x* of m in number are combined together. The antenna temperature $T_A$ in each of the sub-arrays 1X can be determined through the aforementioned formula (1). At that time, the gain function of the sub-array 1X is substituted for $G(\Omega)$.

The term "one-dimensional" means that the beam is electronically steered only in a single direction. In the phased-array 1X shown in FIG. 2, the beam is steered in the scan direction. The term "phased-array" means that the reception outputs of the radiation elements 1*x* are phase-shifted by the variable phase shifters 2*x* and combined. Such a one-dimensional electronic steering operation can be accomplished by causing the phase-shift controller 3 to change the phase-shift in the variable phase shifters 2*x* of m in number provided for each sub-array 1X, that is, in the phased-array manner. In the first embodiment, another plurality of radiation elements 1*x* are disposed in a direction not relating to the beam steering, that is, in the direction perpendicular to the scan direction. This improves the receiving gain.

A sub-array selection switch 7 and switch controller 8, which are newly provided in the first embodiment, function as means for selecting one of the sub-arrays 1X of M/m in number for receiving the microwave noise radiation from the object to be measured. More particularly, the sub-array selection switch 7 has a function of selectively connecting any one of the sub-arrays 1X of M/m in number to the low noise receiver 4 while the switch controller 8 functions to control the sub-array selection switch 7. In the first embodiment, therefore, the beams of the receiving antenna 1 can be electronically steered through control of the sub-array selection switch 7 in addition to the control of phase-shift for each sub-array 1X.

Figure 3:
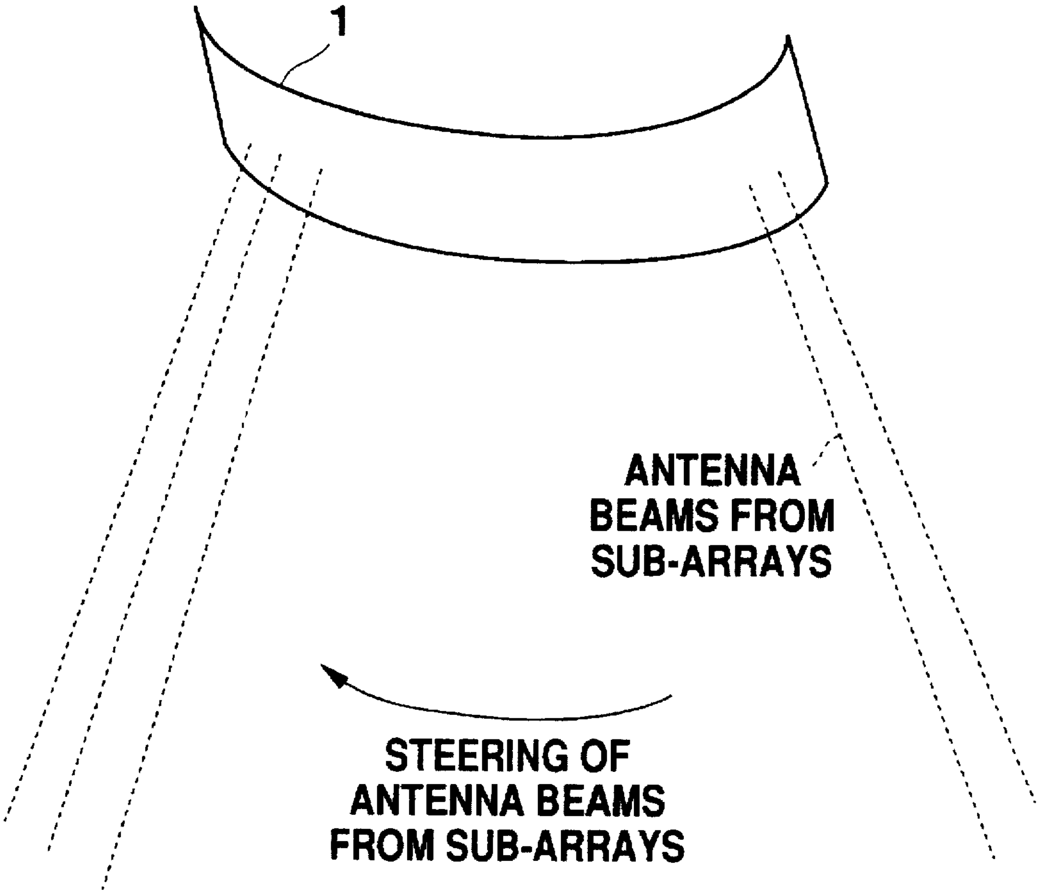
FIG. 3 is a view of the appearance of a cylindrical one- or two-dimensional phased-array receiving antenna constructed according to any one of the first, eleventh to fourteenth, twenty-fourth to twenty-seventh and twenty-ninth to thirtieth embodiments of the present invention, showing the direction of beams in the respective sub-arrays.
Figure 4:
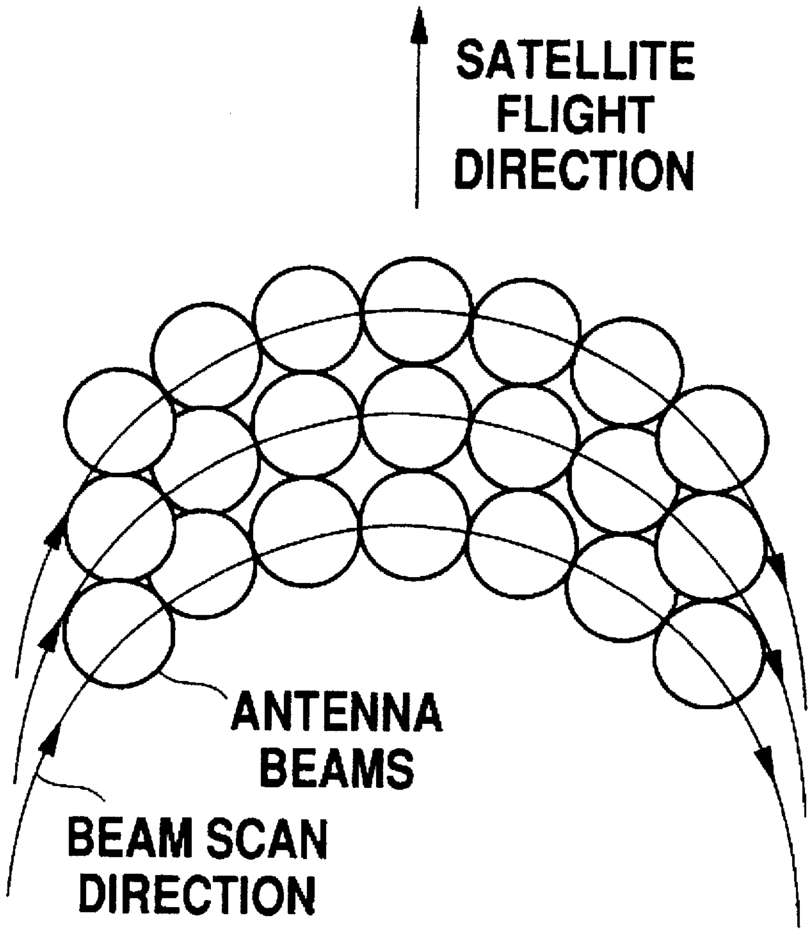
FIG. 4 is a conceptual view of a conical single-area scan according to any one of the first, third, eleventh to fourteenth, sixteenth, twenty-fourth to twenty-seventh and thirtieth embodiments of the present invention.

FIG. 3 shows the outline of the receiving antenna 1 and the direction of antenna beams in the sub-arrays 1X in the first embodiment while FIG. 4 shows the process of scanning the surface of the earth or another planet.

The receiving antenna 1 used in the first embodiment is in the form of a partial cylindrical one-dimensional phased-array antenna as described, that is, a cylinder-shaped antenna using one-dimensional phased-array antennas as sub-arrays 1X. The term "cylinder" means that the sub-arrays 1X of M/m in number are arranged in a partial cylindrical manner and that the beam of each of the sub-arrays 1X is directed outwardly from the cylinder. To realize such a "partial cylinder", the angle or attitude of each of the sub-arrays 1X may suitably be set when they are mounted in the artificial satellite. At that time, the angle or attitude must be adjusted so that the beam direction in each of the sub-arrays 1X provides a precisely fixed incident angle relative to the surface of the earth independently of the scan.

By selecting the sub-arrays of M/m in number disposed along the scan direction in the disposed order, therefore, the receiving antenna 1 can be steered at a given speed to select the beam of the respective one of the sequentially disposed sub-arrays 1X sequentially, as shown in FIG. 3. The steering can be accomplished by causing the sub-array selection switch 7 to select the sub-arrays of M/m in number in the disposed order at a given speed in response to commands from the switch controller 8. When the phase-shift in each of the sub-arrays 1X is controlled, the steering can be more precisely executed. As shown in FIG. 4, this steering enables a single-area scan on the surface of the earth or other planet to be conically performed as along an arc. Since such an arc moves upwardly as viewed in FIG. 4 with advance of the artificial satellite, the surface of the earth or other planet can be substantially completely scanned by the ESMR shown in FIG. 1.

To sharpen the beam of each of the sub-arrays 1X, it is required to form an isophase plane in front of the aperture plane thereof. Since, the radiation elements 1*x* of N in number belonging to the same column are disposed in the direction perpendicular to the scan direction or on a straight line, in the direction perpendicular to the scan direction, it is relatively easy to form the isophase lines in front of the aperture plane. However, the radiation elements of m in number belonging to the same row are arranged along the scan direction or on a curved line to form such a cylindrical surface as shown in FIG. 3 when the ESMR is mounted in the artificial satellite. A device for forming the isophase lines in front of the aperture plane is required relating to the scan direction. More particularly, the phase-shift in each of the variable phase shifters 2$x$ corresponding to the radiation elements 1$x$ of m in number belonging to the same row may be controlled to arrange the radiating faces of the radiation elements 1$x$ on a straight line. The phase-shift controller 3 can also control the phase-shift for such a purpose.

In such an arrangement, the received signals represents an averaged brightness temperature within the beam width of the sub-array 1X relating to the reception. As in the prior art, the received signals are amplified and detected by the low noise amplifier 4 and then integrated by the integrator 5 before they are analog/digital converted and formatted by the signal processor 6. The resulting measurement signals are wirelessly transmitted to the earth station through a transmitter (not shown). The measurement signals received by the earth station are then processed by an image processing equipment to provide a brightness temperature map representing the result of measurement. The ESMR of the first embodiment also has a temperature resolution which can be represented by the formula (2).

The first embodiment can maintain the incident angle of the beam invariable independently of the scan since the surface of the earth or other planet is conically scanned. Both the temperature and range resolutions can be maintained at better levels by setting the speed of sub-array switching in the sub-array selection switch 7 depending on the altitude of the artificial satellite. If the speed of sub-array switching in the sub-array selection switch 7 is set at a level slightly lower than the level determined depending on the altitude of the artificial satellite (or in a so-called underlap state), the temperature resolution can be improved with slight loss of the range resolution. If the speed of sub-array switching is slightly higher than said level (or in a so-called overlap state), the range resolution can be improved with slight loss of the temperature resolution.

Second Embodiment

Figure 5:
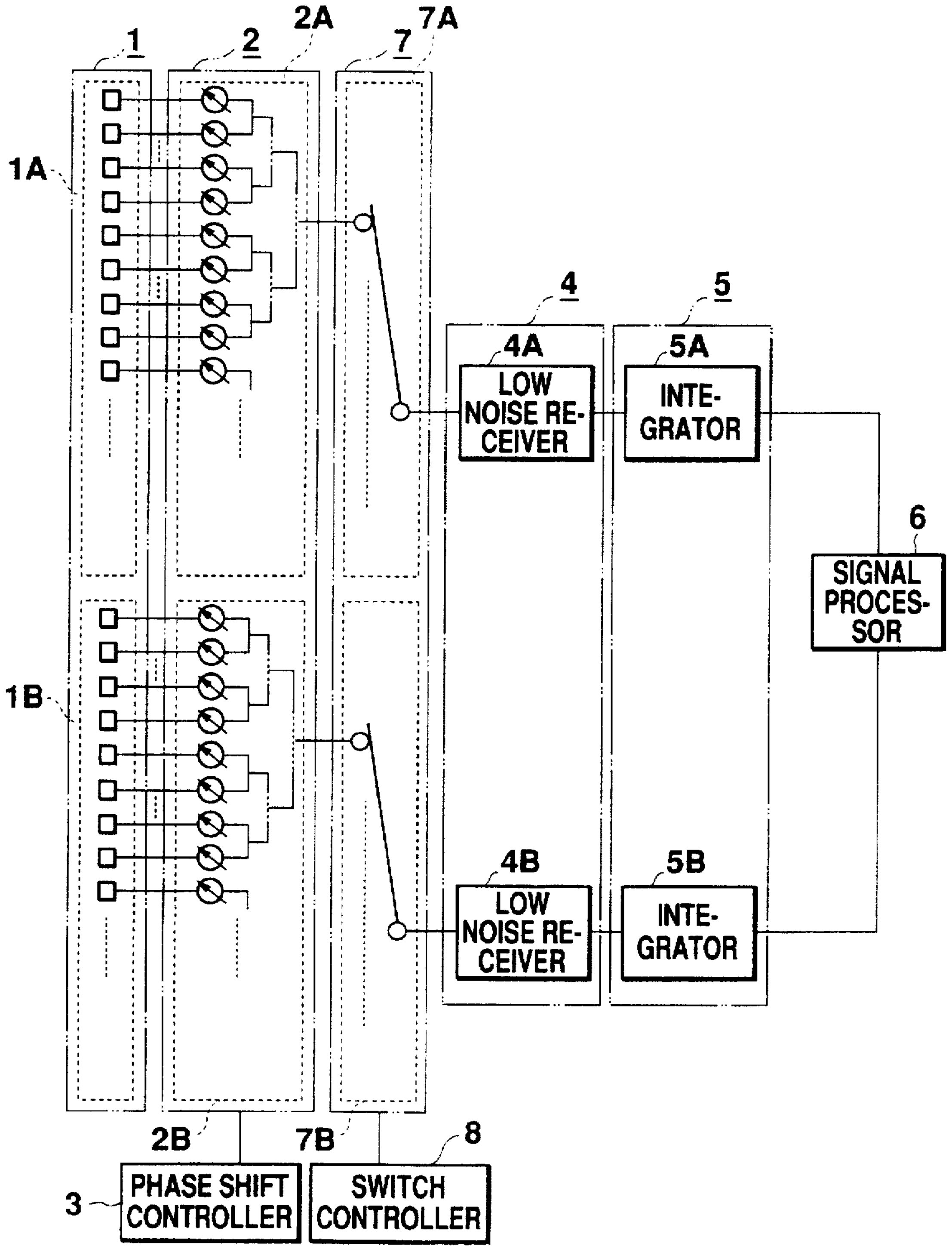
FIG. 5 is a block diagram of an ESMR which is constructed according to any one of the second, fourth, fifth, seventh, ninth, seventeenth, eighteenth, twentieth and twenty-second embodiments of the present invention and which can perform a conical multi-area scan.

FIG. 5 shows the second embodiment of an ESMR constructed according to the present invention. The second embodiment is essentially different from the first embodiment in that the receiving antenna 1 of the second embodiment is in the form of a multiple cylindrical one-dimensional phased-array antenna. The description relating to the first embodiment can also be applied to the second embodiment except for the above difference and other associated differences.

Figure 6:
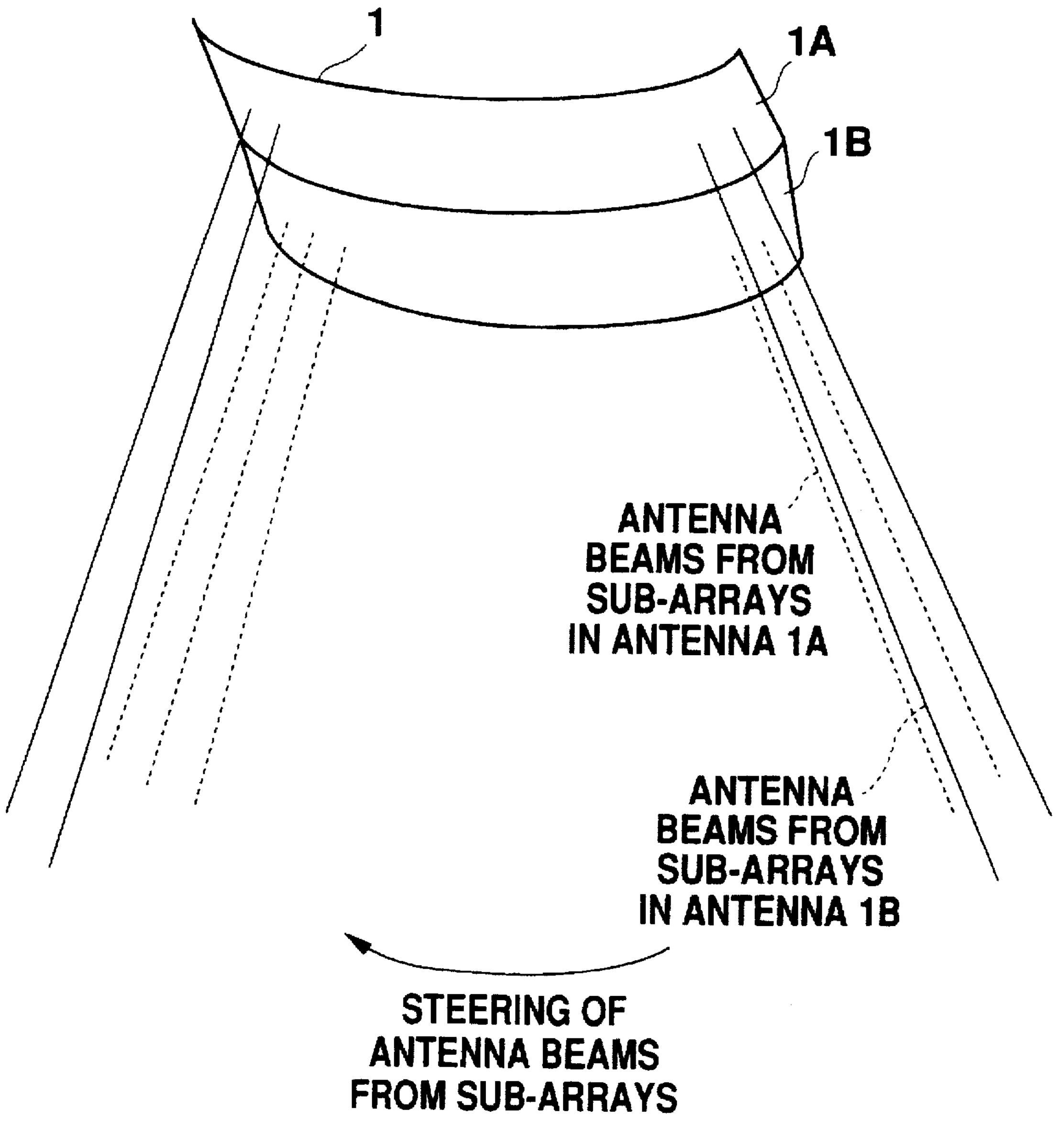
FIG. 6 a view of the appearance of a multiple cylindrical one- or two-dimensional phased-array receiving antenna constructed according to any one of the second, fifteenth and twenty-eighth embodiments of the present invention, showing the direction of beams in the respective sub-arrays.

The multiple cylindrical one-dimensional phased-array antenna is a composite antenna comprising a plurality of cylindrical one-dimensional phased-array antennas which are different in design or attitude from one another. If the receiving antenna 1 is formed by two cylindrical one-dimensional phased-array antennas, it generates two beams, a beam of a cylindrical one-dimensional phased-array antenna shown by solid line 1A in FIG. 6 and another beam of a cylindrical one-dimensional phased-array antenna beam shown by broken line 1B in FIG. 6.

Figure 7:
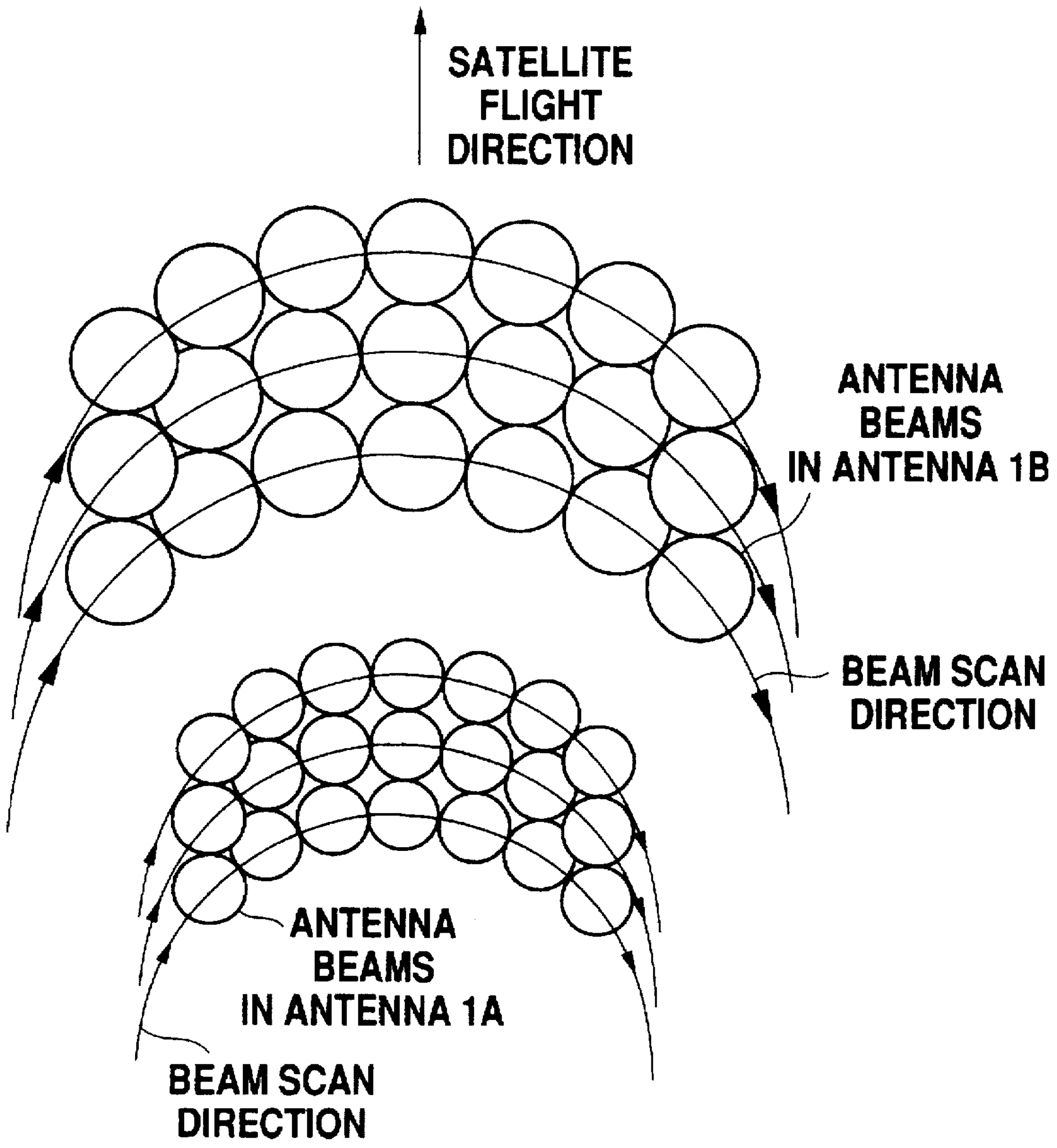
FIG. 7 is a conceptual view of a conical multi-area scan according to any one of the second, fourth, fifth, seventh, fifteenth, seventeenth, eighteenth, twentieth and twenty-eighth embodiments of the present invention.

Therefore, each of the cylindrical one-dimensional phased-array antennas 1A and 1B can perform the conical single-area scan on the surface of the earth or another planet. If the radiation elements 1$x$ forming the cylindrical one-dimensional phased-array antennas 1A and 1B are mounted in the artificial satellite such that the beam of the cylindrical one-dimensional phased-array antenna 1A scans an area at a relatively forward location along the direction of the artificial satellite while the beam of the cylindrical one-dimensional phased-array antenna 1B scans another area at the relatively forward location, such a conical multi-area scan as shown in FIG. 7 can be accomplished.

As shown in FIG. 5, the second embodiment comprises a phase shifting unit 2A, sub-array selection switch unit 7A, low noise receiver unit 4A and integrator unit 5A all of which are provided for the cylindrical one-dimensional phased-array antenna 1A. The second embodiment also comprises a phase shifting unit 2B, sub-array selection switch unit 7B, low noise receiver unit 4B and integrator unit 5B all of which are provided for the cylindrical one-dimensional phased-array antenna 1B. These units are respectively paired to form the phase shifting circuit 2, the sub-array selection switch 7, the low noise receiver 4 and the integrator 5. The signal processor 6 processes the outputs of both the integrator units 5A and 5B as in the signal processor 6 of the first embodiment.

The phase-shift controller 3 and switch controller 8 are actuated in synchronism with each other to execute the control of the units 2A and 7A corresponding to the cylindrical one-dimensional phased-array antenna 1A and the control of the units 2B and 7B corresponding to the cylindrical one-dimensional phased-array antenna 1B. It is of course possible that such an actuation may be made asynchronously.

The number of cylindrical one-dimensional phased-array antennas forming the multiple cylindrical one-dimensional phased-array antenna 1 may be any number larger than two. When the antenna temperature is estimated according to the formula (1), it must be made for every beam. The number of sub-arrays 1X in one cylindrical one-dimensional phased-array antenna 1A or 1B may be different from that of the other cylindrical one-dimensional phased-array antenna 1B or 1A. The number of radiation elements 1$x$ in one sub-array 1X may be different from that of any other sub-array 1X. The isophase plane in front of the aperture plane may be formed for each cylindrical one-dimensional phased-array antenna.

Third Embodiment

Figure 8:
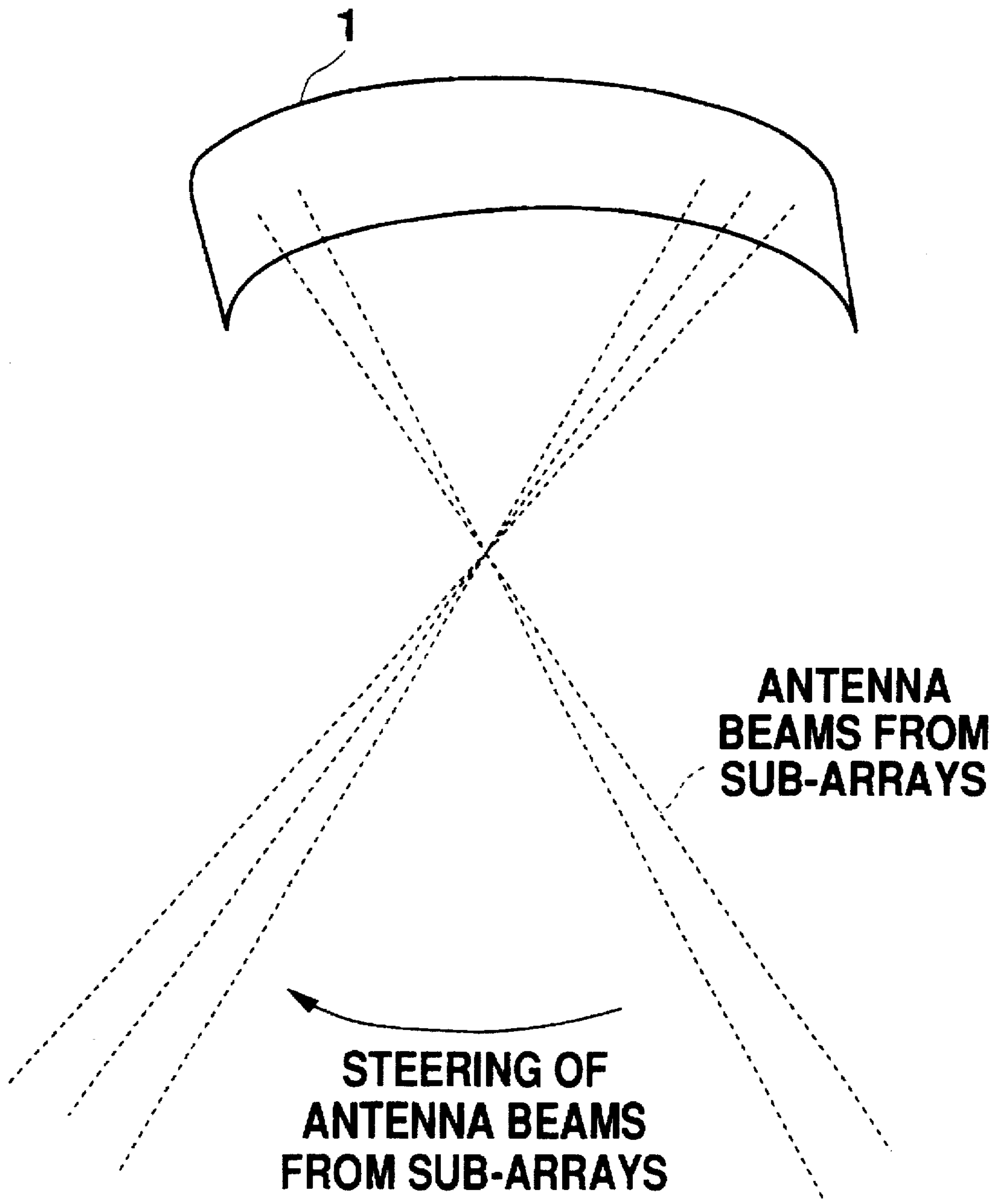
FIG. 8 is a view of the appearance of an inverse-directional cylindrical one- or two-dimensional phased-array receiving antenna constructed according to any one of the third and sixteenth embodiments of the present invention, showing the direction of beams in the respective sub-arrays.

FIG. 8 shows the third embodiment of an ESMR constructed according to the present invention, particularly illustrating the appearance of a receiving antenna 1 and the direction of antenna beams in the sub-arrays 1X. The third embodiment is different from the first embodiment only in that the receiving antenna 1 of the third embodiment is in the form of an inverse-directional cylindrical one-dimensional phased-array antenna. The description relating to the first embodiment can also be applied to the third embodiment except for the above difference and other associated differences.

The inverse-directional cylindrical one-dimensional phased-array antenna is an antenna directing its beams inwardly from the cylindrical surface in a manner opposite to that of the cylindrical one-dimensional phased-array antenna. The other features are similar to those of the cylindrical one-dimensional phased-array antenna. Due to such a difference, the direction of beam is varied as will be apparent from comparison between FIGS. 3 and 8. The third embodiment provides the same advantages as in the first embodiment.

Fourth Embodiment

Figure 9:
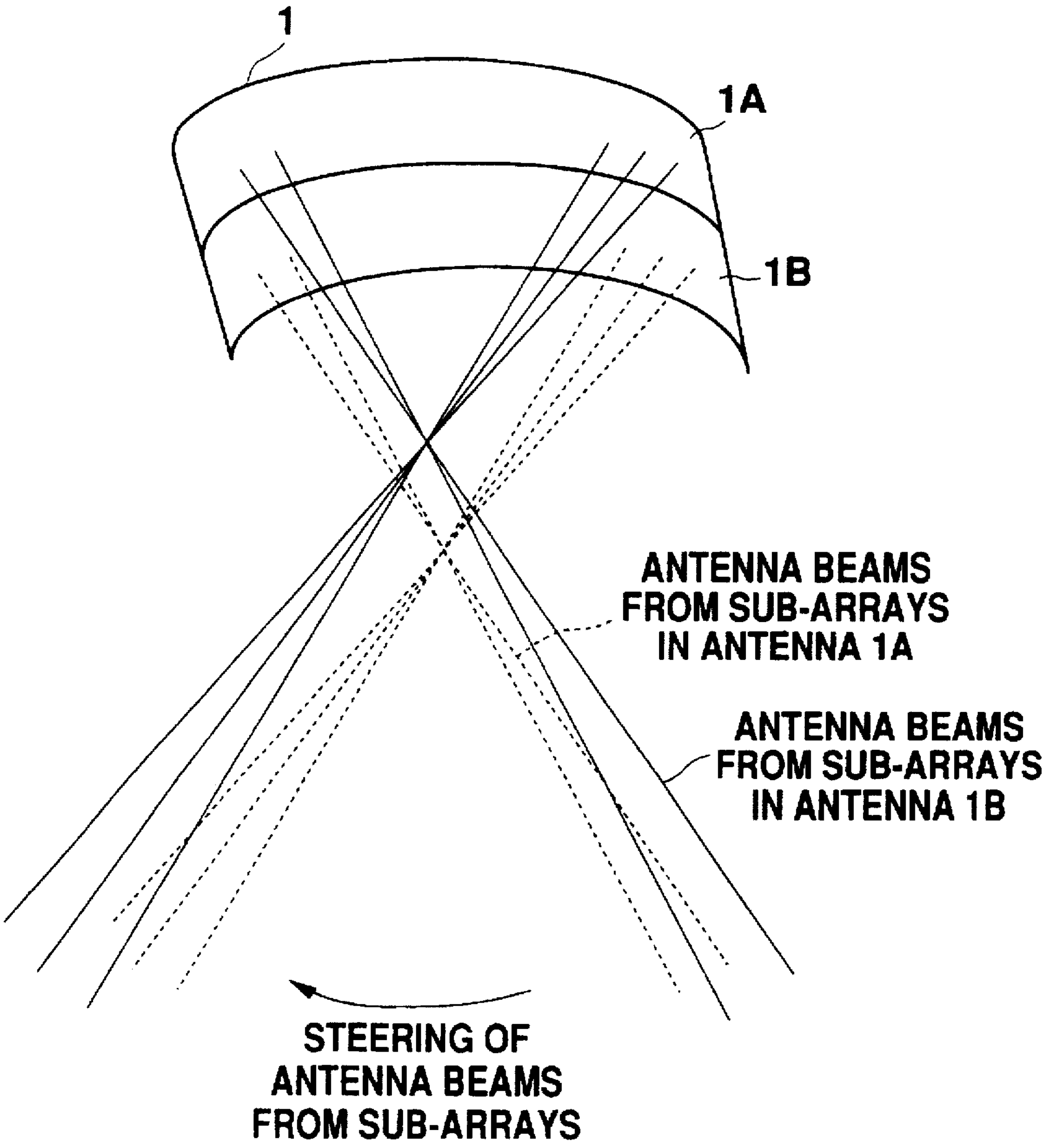
FIG. 9 is a view of the appearance of a multiple inverse-directional cylindrical one- or two-dimensional phased-array receiving antenna constructed according to any one of the fourth and seventeenth embodiments of the present invention, showing the direction of beams in the respective sub-arrays.

FIG. 9 shows the fourth embodiment of an ESMR constructed according to the present invention, particularly illustrating the appearance of a receiving antenna 1 and the direction of antenna beams in the sub-arrays 1X. The fourth embodiment is different from the second and third embodiments in that the receiving antenna of the fourth embodiment is in the form of a multiple inverse-directional cylindrical one-dimensional phased-array antenna. The description relating to the first to third embodiments can also be applied to the fourth embodiment except for the above difference and other associated differences.

The multiple inverse-directional cylindrical one-dimensional phased-array antenna is a composite antenna including a plurality of inverse-directional cylindrical one-dimensional phased-array antennas (shown by 1A and 1B in FIG. 9) in a manner opposite to the multiple cylindrical one-dimensional phased-array antenna. The circuit used in this embodiment and its operation are similar to those of the second embodiment. Due to such a difference, the fourth embodiment generates a different direction of beam as will be apparent from comparison between FIGS. 6 and 9.

Fifth Embodiment

Figure 10:
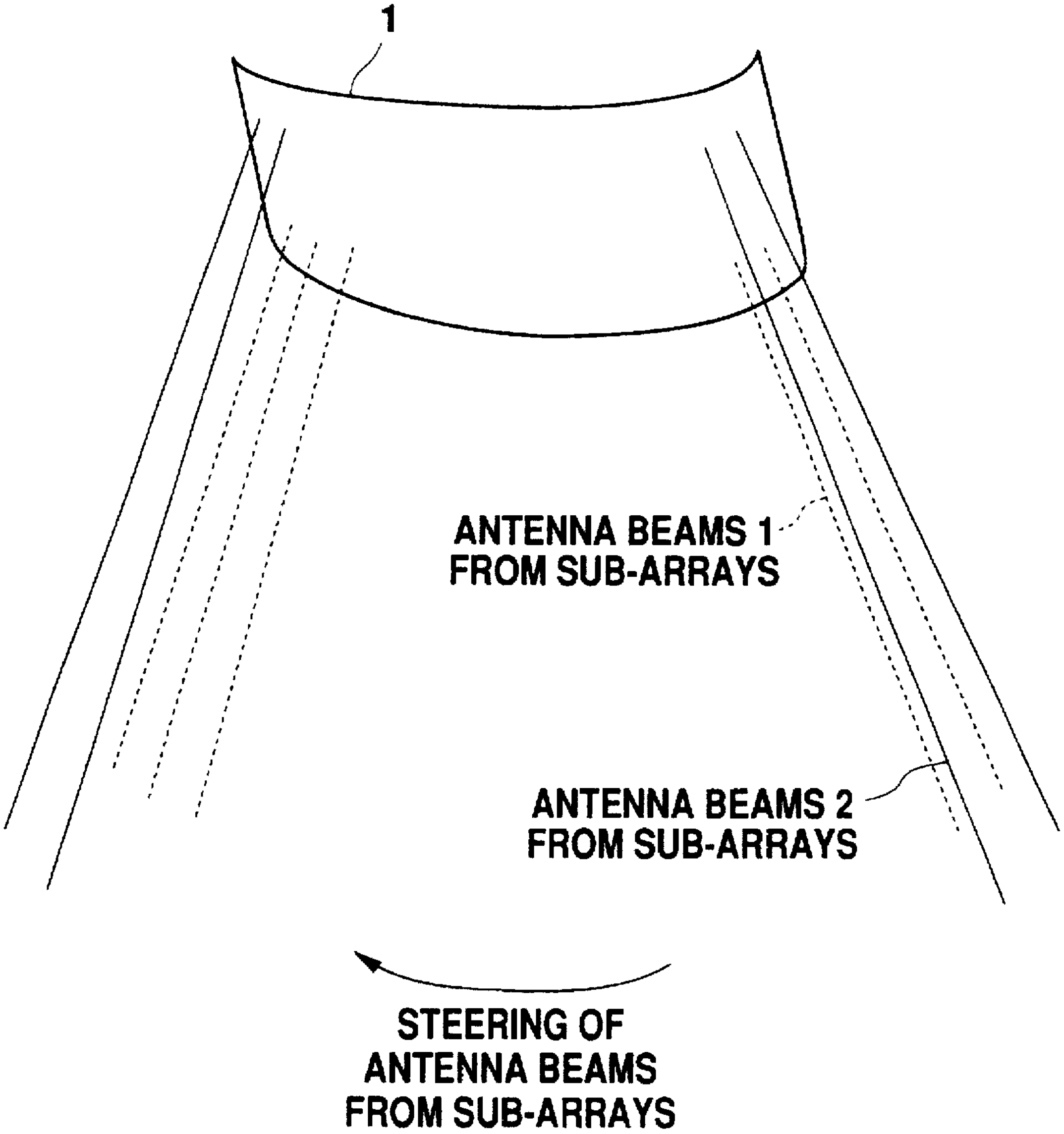
FIG. 10 is a view of the appearance of a multi-beam type cylindrical one- or two-dimensional phased-array receiving antenna constructed according to any one of the fifth, ninth, tenth, eighteenth, twenty-second and twenty-third embodiments of the present invention, showing the direction of beams in the respective sub-arrays.

FIG. 10 shows the fifth embodiment of an ESMR constructed according to the present invention, particularly illustrating the appearance of a receiving antenna 1 and the direction of antenna beams in the sub-arrays 1X. The fifth embodiment is different from the second embodiment in that the receiving antenna of the fifth embodiment is in the form of a multi-beam type cylindrical one-dimensional phased-array antenna. The description relating to the first and second embodiments can also be applied to the fourth embodiment except for the above difference and other associated differences. However, the wordings "the beam of the antenna 1A" and "the beam of the antenna 1B" in FIG. 7 should be read like "the first beam of the antenna 1" and "the second beam of the antenna 1", respectively.

The multi-beam type cylindrical one-dimensional phased-array antenna is a cylindrical one-dimensional phased-array antenna comprising a plurality of sub-arrays 1X arranged in the scan direction, each of the sub-arrays 1X being adapted to form a plurality of beams on a plane parallel to the direction perpendicular to the scan direction. Therefore, if the number of beams from a sub-array 1X on the plane parallel to the direction perpendicular to the scan direction is two, such an arrangement as shown in FIG. 10 is provided. Thus, the fifth embodiment can also provide functions and advantages similar to those of the second embodiment.

Sixth Embodiment

Figure 11:
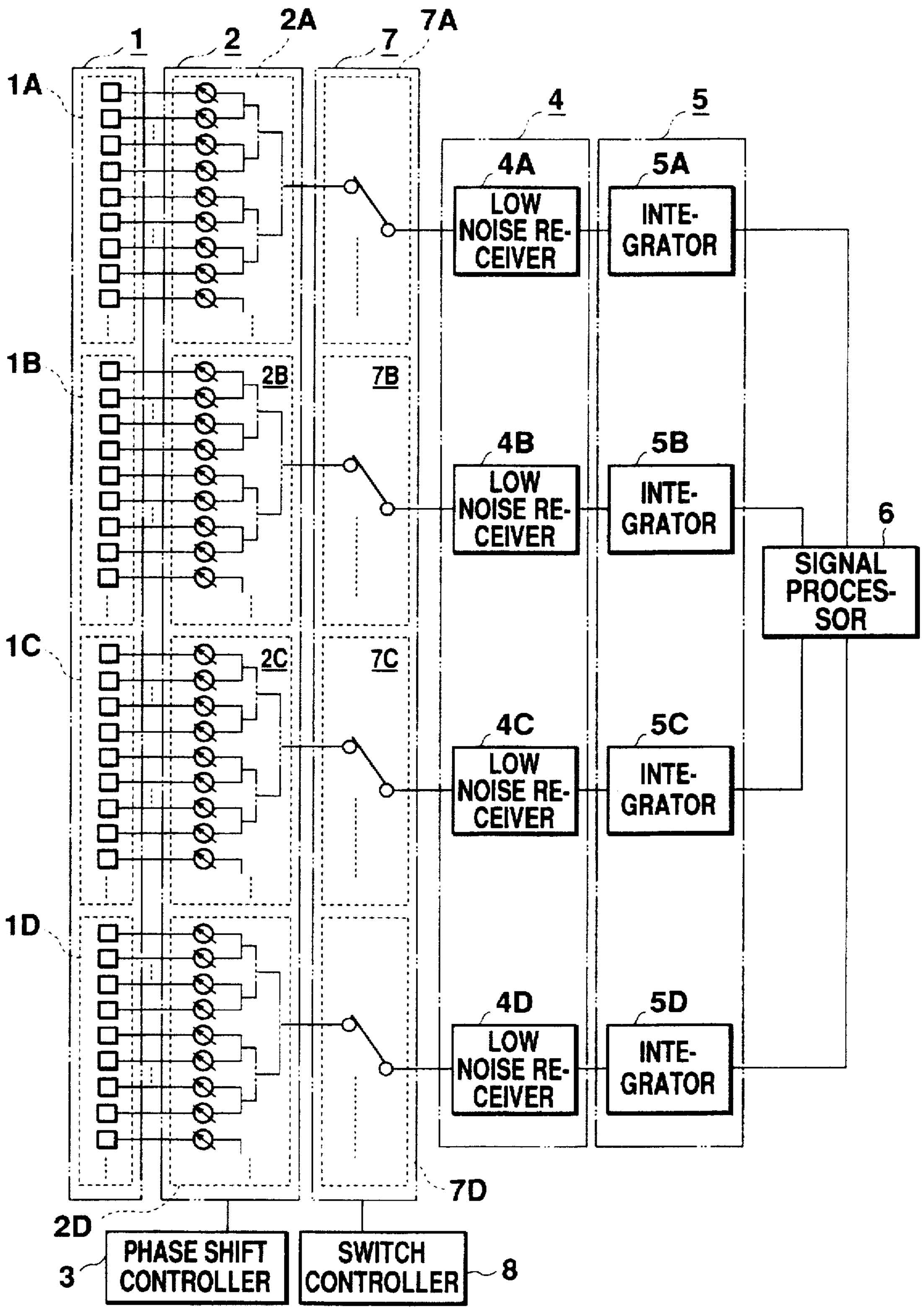
FIG. 11 is a block diagram of an ESMR which is constructed according to any one of the sixth, eighth, tenth, nineteenth, twenty-first and twenty-third embodiments of the present invention and which can perform a conical multi-area scan.
Figure 12:
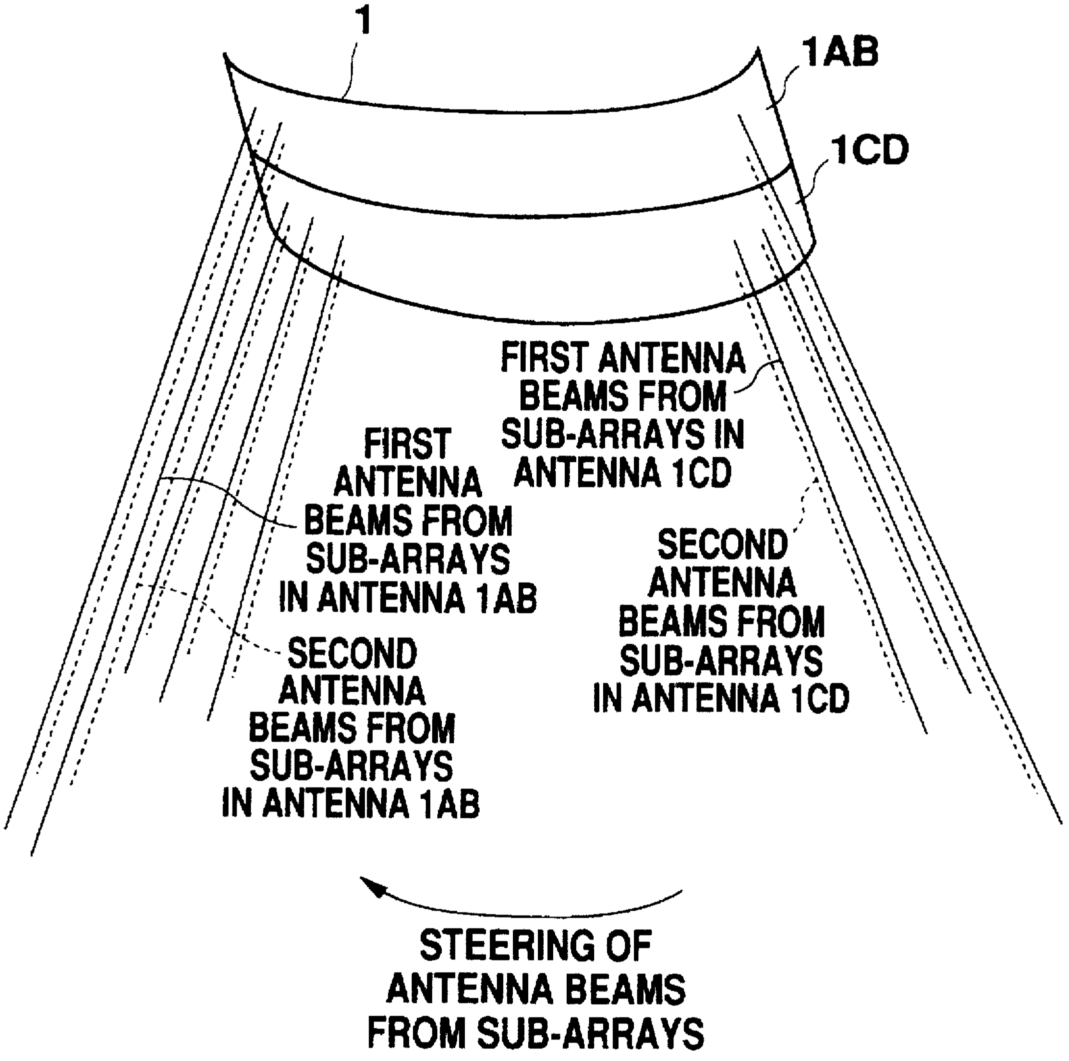
FIG. 12 is a view of the appearance of a multi-beam type multiple cylindrical one- or two-dimensional phased-array receiving antenna constructed according to any one of the sixth and nineteenth embodiments of the present invention, showing the direction of beams in the respective sub-arrays.

FIG. 11 shows the sixth embodiment of an ESMR constructed according to the present invention, particularly illustrating the functional block diagram. The sixth embodiment is different from the fifth embodiment in that the receiving antenna 1 of the sixth embodiment is in the form of a multi-beam type multiple cylindrical one-dimensional phased-array antenna as shown in FIG. 12. The description relating to the first, second and fifth embodiments can also be applied to the fourth embodiment except for the above difference and other associated differences.

The multi-beam type multiple cylindrical one-dimensional phased-array antenna is a composite antenna comprising a plurality of multi-beam type cylindrical one-dimensional phased-array antennas which are different in design or attitude from one another. If the multi-beam type multiple cylindrical one-dimensional phased-array antenna is formed by two multi-beam type cylindrical one-dimensional phased-array antennas and when each of the multi-beam type cylindrical one-dimensional phased-array antennas generates two beams on the plane parallel to the direction perpendicular to the scan direction, the total number of beams equal to 4=2×2 are formed on the plane parallel to the direction perpendicular to the scan direction.

In such an arrangement as shown in FIG. 11, each of the receiving antenna 1, phase shifting circuit 2, sub-array selection switch 7, low noise receiver 4 and integrator 5 is formed by four units shown by their reference numerals with attendant letters A, B, C and D because these units are provided for four beams in total. The other functions of the system shown in FIG. 11 are similar to those of FIG. 5.

Although it is assumed herein that the receiving antenna 1 is formed by two multi-beam type cylindrical one-dimensional phased-array antennas as described, FIG. 11 shows the receiving antenna 1 divided into four sections 1A to 1D. This is because the relationship between the beams and the circuit functions is to be clarified. Each of the units 1A to 1D in FIG. 11 will not define a single antenna. As shown in FIG. 12, actually, the receiving antenna 1 is a composite antenna comprising two multi-beam type cylindrical one-dimensional phased-array antennas 1AB and 1CD. The multi-beam type cylindrical one-dimensional phased-array antenna 1AB undertakes the functions of the units 1A and 1B while the multi-beam type cylindrical one-dimensional phased-array antenna 1CD undertakes the functions of the units 1C and 1D.

Figure 13:
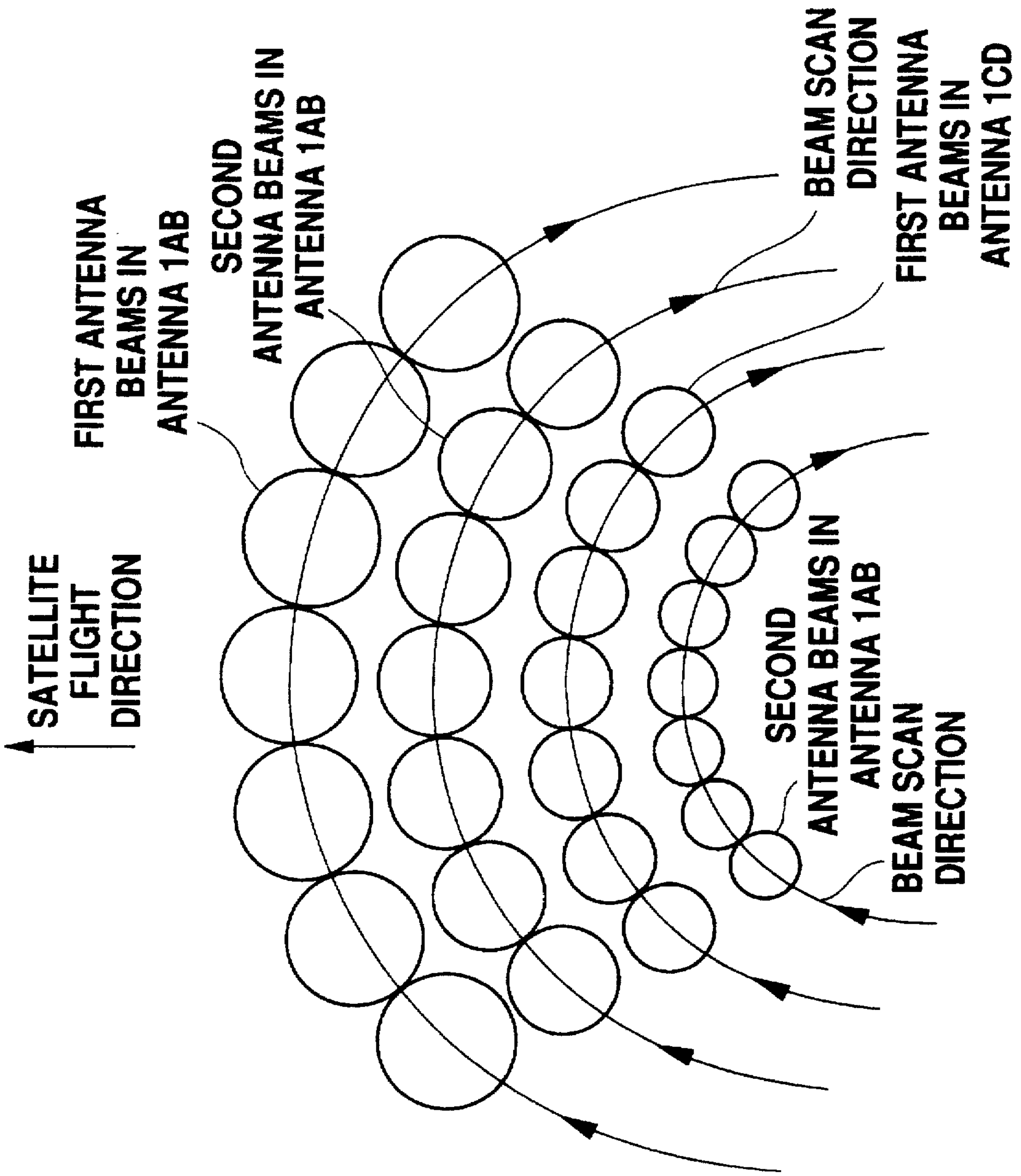
FIG. 13 is a conceptual view of a conical multi-area scan according to any one of the sixth, eighth, nineteenth and twenty-first embodiments of the present invention.

Such an arrangement can accomplish such a conical multi-area scan as shown in FIG. 13.

Seventh Embodiment

Figure 14:
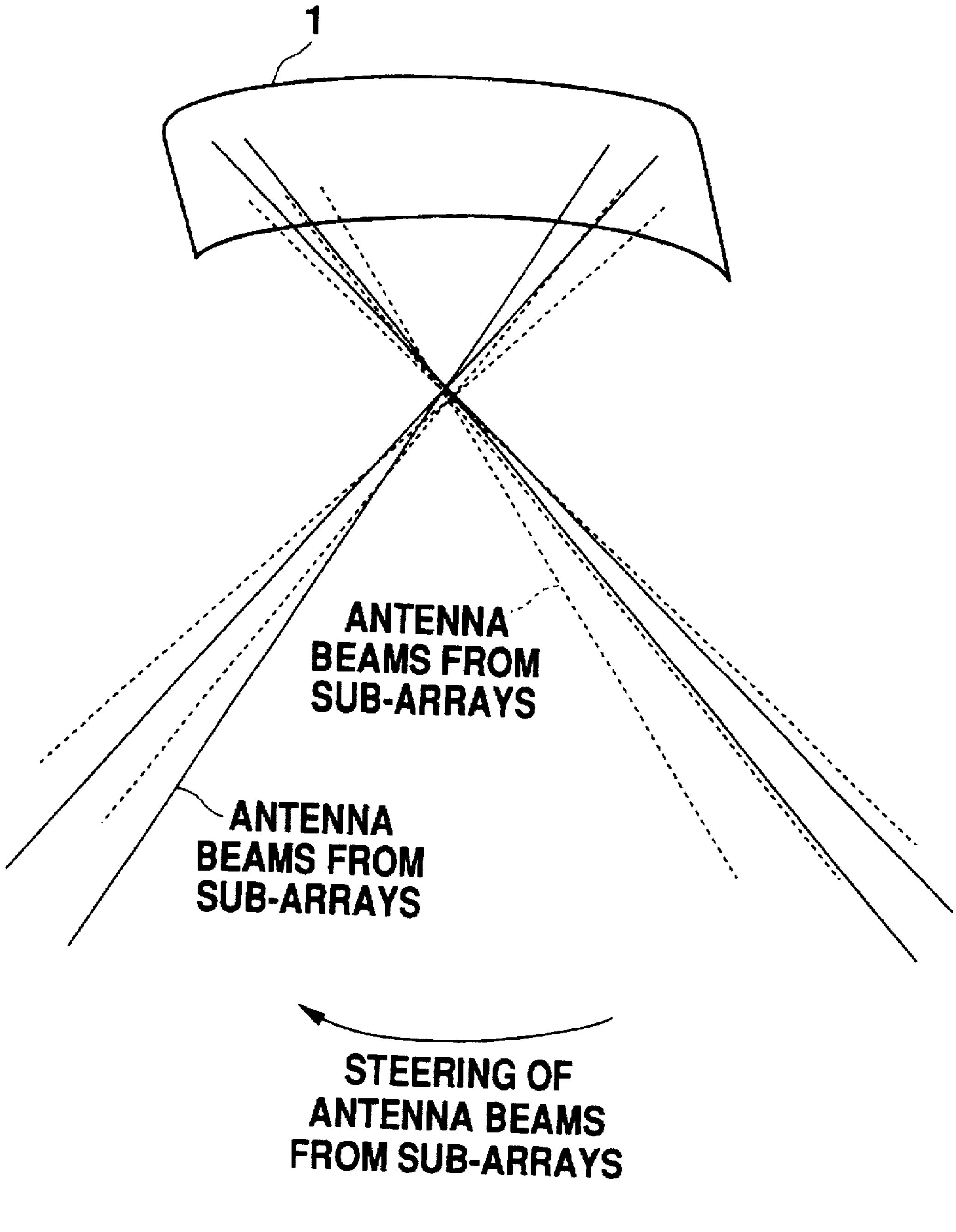
FIG. 14 is a view of the appearance of a multi-beam type inverse-directional cylindrical one- or two-dimensional phased-array receiving antenna constructed according to any one of the seventh and twentieth embodiments of the present invention, showing the direction of beams in the respective sub-arrays.

FIG. 14 shows the seventh embodiment of an ESMR constructed according to the present invention, particularly illustrating the appearance of a receiving antenna 1 and the direction of antenna beams in the sub-arrays 1X. The seventh embodiment is different from the fifth embodiment in that the receiving antenna of the seventh embodiment is in the form of a multi-beam type inverse-directional cylindrical one-dimensional phased-array antenna. The description relating to the first, third and fifth embodiments can also be applied to the seventh embodiment except for the above difference and other associated differences. However, the wordings "the beam of the antenna 1A" and "the beam of the antenna 1B" in FIG. 7 should be read like "the first beam of the antenna 1" and "the second beam of the antenna 1", respectively.

The multi-beam type inverse-directional cylindrical one-dimensional phased-array antenna is an inverse-directional cylindrical one-dimensional phased-array antenna comprising a plurality of sub-arrays 1X arranged in the scan direction, each of the sub-arrays 1X being adapted to generate a plurality of beams on the plane parallel to the direction perpendicular to the scan direction. If two beams from the sub-array 1X are formed on the plane parallel to the direction perpendicular to the scan direction, therefore, such an arrangement as shown in FIG. 14 will be provided. Thus, the seventh embodiment can provide the same functions and advantages as in the fifth embodiment.

Eighth Embodiment

Figure 15:
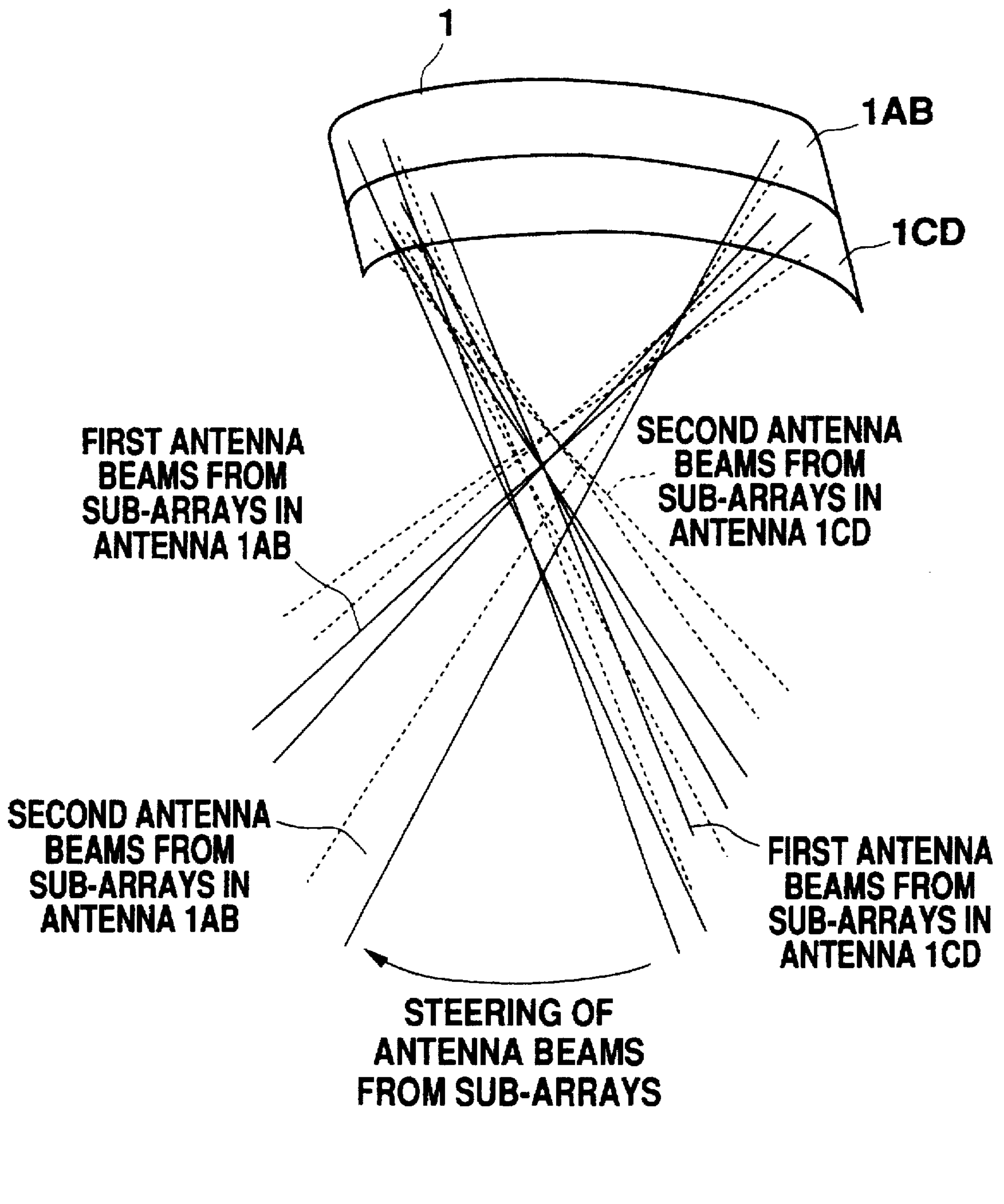
FIG. 15 is a view of the appearance of a multi-beam type multiple inverse-directional cylindrical one- or two-dimensional phased-array receiving antenna constructed according to any one of the eighth and twenty-first embodiments of the present invention, showing the direction of beam in the respective sub-arrays.

FIG. 15 shows the eighth embodiment of an ESMR constructed according to the present invention, particularly illustrating the appearance of a receiving antenna 1 and the direction of antenna beams in the sub-arrays 1X. The eighth embodiment is different from the sixth embodiment in that the receiving antenna of the eighth embodiment is in the form of a multi-beam type multiple inverse-directional cylindrical one-dimensional phased-array antenna. The description relating to the first, third and sixth embodiments can also be applied to the seventh embodiment except for the above difference and other associated differences. However, the wordings "the first beam of the antenna 1AB", "the second beam of the antenna 1AB", "the first beam of the antenna 1CD" and "the second beam of the antenna 1CD" in FIG. 13 should be read like "the first beam of the antenna 1", "the second beam of the antenna 1", "the third beam of the antenna 1" and "the fourth beam of the antenna 1", respectively.

The multi-beam type multiple inverse-directional cylindrical one-dimensional phased-array antenna is a composite antenna comprising a plurality of multi-beam type inverse-directional cylindrical one-dimensional phased-array antennas. If the multi-beam type multiple inverse-directional cylindrical one-dimensional phased-array antenna is formed by two multi-beam type inverse-directional cylindrical one-dimensional phased-array antennas and when two beams from each of the multi-beam type inverse-directional cylindrical one-dimensional phased-array antennas are formed on the plane parallel to the direction perpendicular to the scan direction, beams equal to 4=2×2 in total will be formed on the plane parallel to the direction perpendicular to the scan direction. Thus, such a circuit as shown in FIG. 11 can be used to accomplish such a conical multi-area scan as shown in FIG. 13.

Ninth Embodiment

Figure 16:
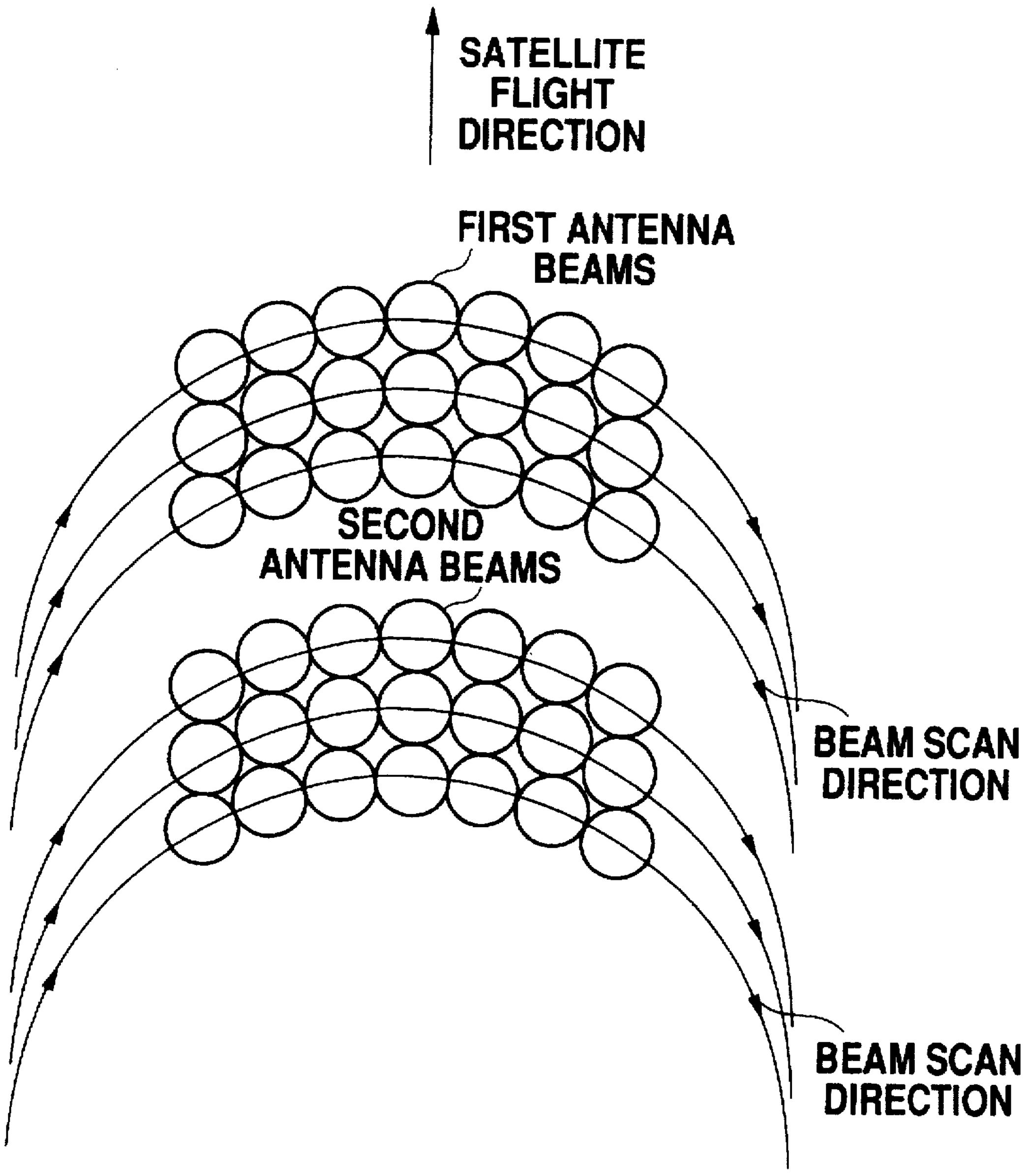
FIG. 16 is a conceptual view of a conical multi-area scan which is constructed according to any one of the ninth and twenty-second embodiments of the present invention and which can equivalently prolong the integration time.

FIG. 16 conceptually shows a scanning process in the ninth embodiment of an ESMR constructed according to the present invention. The ninth embodiment is different from the fifth embodiment in that a multiplexed conical multi-area scan is used to prolong the integration time $\tau$ equivalently in the direction of orbiting and thus to improve the temperature resolution $\Delta T$. The description relating to the first and fifth embodiments can also be applied to the ninth embodiment except for the above difference and other associated differences.

As will be apparent from comparison between FIGS. 7 and 16, the multiplexed conical multi-area scan means that an area previously conically scanned by the first beam of the antenna 1 is conically scanned by the second beam of the antenna 1 after a given time period. To accomplish such a scan, the ninth embodiment provides the changed arrangements of the sub-arrays 1X and the radiation elements 1*x* in each sub-array 1X in the receiving antenna 1 according to the fifth embodiment. How to change these arrangements is omitted in the drawings, but will be apparent for a person skilled in the art after reading the disclosure.

When such an improved conical multi-area scan is executed, the ninth embodiment can equivalently prolong the integration time $\tau$. More particularly, if the signal processor 6 or earth equipment combines the measurement signals obtained through the first and second beams, the temperature resolution $\Delta T$ can be determined as follows:

$$\Delta T=K(T_A+T_R)/(N_S B_T)^{1/2} \quad (3)$$

where $N_S$ is the number of multiplexed scans or the number of beams in the antenna 1. In FIG. 16, the value $N_S$ equal to two. As will be apparent from comparison between the formulas (3) and (2), the multiplexed conical multi-area scan according to the ninth embodiment can equivalently prolong the integration time $\tau$ up to $N_S\tau$.

Although it has been assumed in the above description that the receiving antenna 1 is in the form of a multi-beam type cylindrical one-dimensional phased-array antenna as in the fifth embodiment, the receiving antenna 1 may be replaced by any other type antenna capable of forming a plurality of beams along the direction perpendicular to the scan direction, for example, by such an antenna as shown in FIG. 6, 9, 12, 14 or 15. The operation made in such a case will be understood with reference to the description relating to the second, fourth and sixth–eighth embodiments.

Tenth Embodiment

Figure 17:
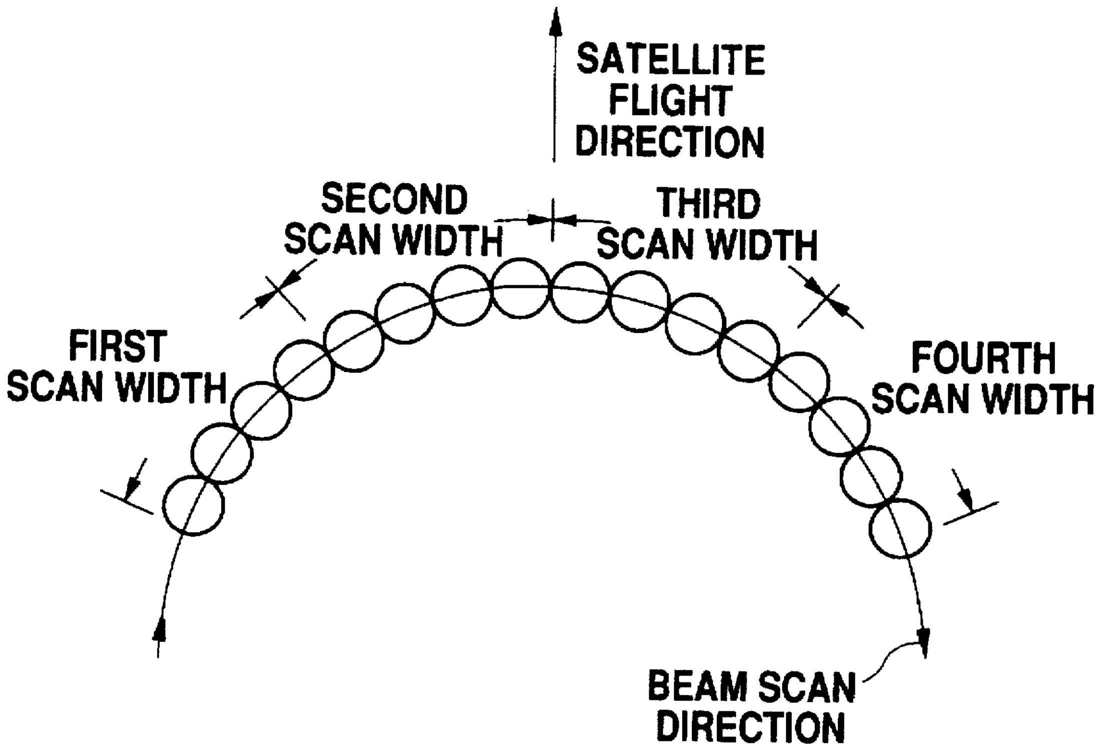
FIG. 17 is a conceptual view of a conical single-area scan which is constructed according to any one of the tenth and twenty-third embodiments of the present invention and which can prolong the integration time.

FIG. 17 conceptually shows a scanning process in the tenth embodiment of an ESMR constructed according to the present invention. The tenth embodiment is different from the fifth embodiment in that a width division type conical single-area scan is used to prolong the integration time $\tau$ equivalently in the scan direction and thus to improve the temperature resolution $\Delta T$. The description relating to the first and fifth embodiments can also be applied to the tenth embodiment except for the above difference and other associated differences. In the tenth embodiment, the functions thereof as well as the structure of each sub-array 1X are similar to those of the sixth and eighth embodiments to accomplish the width division type conical single-area scan.

As will be apparent from comparison between FIGS. 13 and 17, the width division type conical single-area scan is a method of conically scanning the entire width to be scanned by dividing it into a plurality of sections (four in FIG. 17) such that the first width section is scanned by one of the four beams from the receiving antenna 1, the second width section being scanned by another beam and so on. This method can be accomplished by setting the direction of beam in each of the sub-arrays 1X and selecting the sub-arrays through the sub-array selection switch 7. The setting of beam direction can be accomplished by appropriately arranging the radiation elements 1*x* and controlling the phase-shift through the phase-shift controller 3. Although a manner of setting or designing is not illustrated and described, a person skilled in the art can easily understand such aspects from reading the disclosure.

Thus, the tenth embodiment can prolong the integration time $\tau$. More particularly, since each of the divided scan widths is smaller than the non-divided scan width, the scan width apparently becomes smaller than those of the previous embodiments to prolong the integration time $\tau$ for each beam. If measurement signals obtained through the respective beams are combined by the signal processor 6 or earth equipment, the temperature resolution $\Delta T$ can be determined by the formula (3). However, $N_S$ is substituted by the number of divided scan width sections (four in FIG. 17).

Although it has been assumed in the above description that the receiving antenna 1 is in the form of a multi-beam type cylindrical one-dimensional phased-array antenna as in the fifth embodiment, the receiving antenna 1 may be replaced by any other type antenna capable of forming a plurality of beams along the scan direction, for example, by such an antenna as shown in FIG. 6, 9, 12, 14 or 15. The operation made in such a case will be understood with reference to the description relating to the second, fourth and sixth–eighth embodiments.

Eleventh Embodiment

Figure 18:
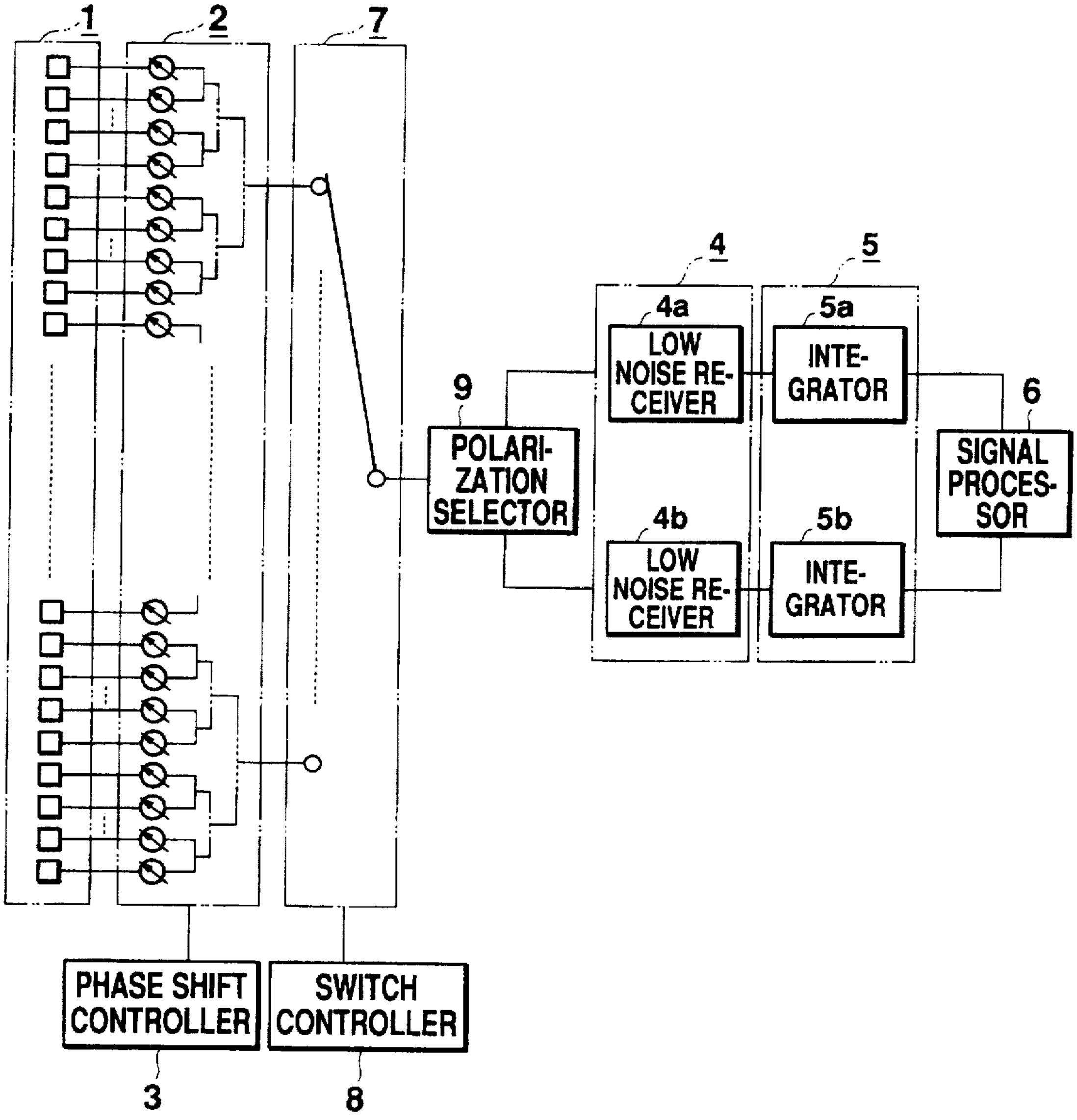
FIG. 18 is a block diagram of an ESMR which is constructed according to any one of the eleventh and twenty-fourth embodiments of the present invention and which can perform a conical single-area scan in a multi-polarization manner.

FIG. 18 shows the eleventh embodiment of an ESMR constructed according to the present invention. The eleventh embodiment is different from the first embodiment in that the radiation elements 1*x* are in the form of a multiple polarization type element. The description relating to the first embodiment can also be applied to the tenth embodiment except for the above difference and other associated differences. Although the details of the multiple polarization type radiation element 1*x* (which is operable through plural kinds of polarizations) will be omitted, they will be apparent for a person skilled in the art.

The eleventh embodiment comprises a polarization selector 9 at the pre-stage of the low noise receiver 4, associated with use of such radiation elements 1*x*. The polarization selector 9 operates to separate the received signals through the sub-array selection switch 7 for every polarization. The eleventh embodiment further comprises a plurality of low noise receiver units and a plurality of integrator units, which units are provided one for each polarization that can be received by the corresponding radiation element 1*x*. FIG. 18 shows two low noise receiver units 4*a*, 4*b* and two integrator units $5a$, $5b$, associated with two different polarizations. Each of the received signals separated by the polarization selector 9 is processed and supplied to the signal processor 6 by the corresponding set of receiver and integrator units in the same manner as in the first embodiment. The signal processor 6 then processes the result of integration for each polarization in the same manner as in the first embodiment.

The eleventh embodiment can provide a multiple polarization type ESMR. Although it has been assumed in the above description that the receiving antenna 1 is in the form of a cylindrical one-dimensional phased-array antenna, the receiving antenna 1 may be replaced by any other type antenna in so far as it can perform the conical scan and includes radiation elements $1x$ operable through multiple polarization, for example, such an antenna as shown in FIG. 6, 8, 9, 10, 12, 14 or 15. The operation made in such a case will be understood with reference to the description relating to the second to eighth embodiments.

Twelfth Embodiment

Figure 19:
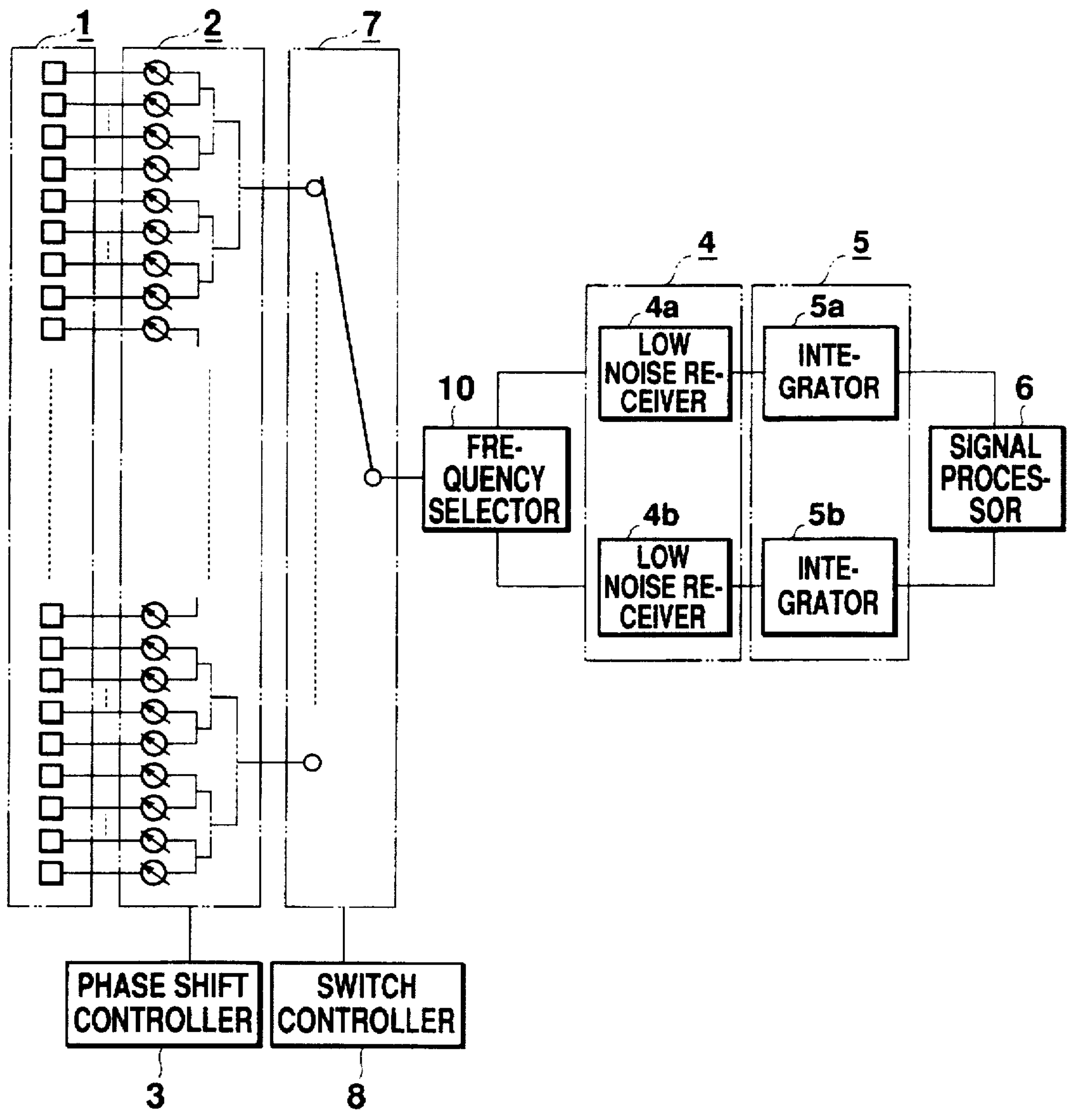
FIG. 19 is a block diagram of an ESMR which is constructed according to any one of the twelfth and twenty-fifth embodiments of the present invention and which can perform a conical single-area scan in a multi-frequency manner.

FIG. 19 shows the twelfth embodiment of an ESMR constructed according to the present invention. The twelfth embodiment is different from the first and eleventh embodiments in that the radiation elements $1x$ are in the form of a multiple frequency type element. The description relating to the first and eleventh embodiments can also be applied to the tenth embodiment except for the above difference and other associated differences. Although the details of the multiple polarization type radiation element $1x$ (which is operable through plural kinds of frequencies) will be omitted, they will be apparent for a person skilled in the art.

The twelfth embodiment uses a frequency selector 10 in place of the polarization selector 9 as described in the eleventh embodiment. The description relating to the eleventh embodiment can be applied directly to the twelfth embodiment if the polarization selector 9 is read in place of the frequency selector 10. The frequency selector 10 separates the received signals supplied through the sub-array selection switch 7 into frequencies. The separated frequencies are then supplied from the frequency selector 10 to the respective set of receiver and integrator units. Thus, the twelfth embodiment can provide a multiple frequency type ESMR.

Thirteenth Embodiment

Figure 20:
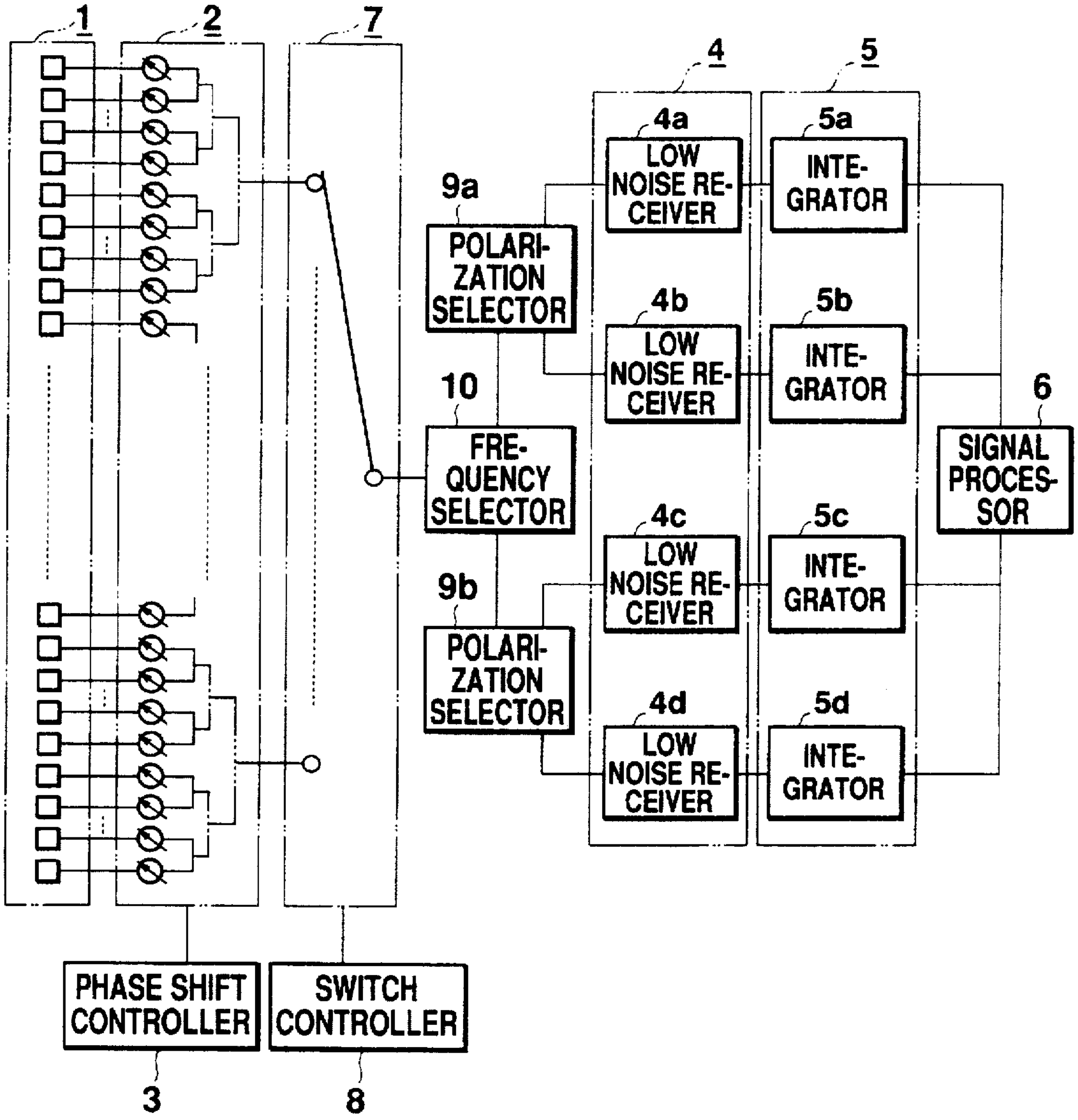
FIG. 20 is a block diagram of an ESMR which is constructed according to any one of the thirteenth and twenty-sixth embodiments of the present invention and which can perform a conical single-area scan in a multi-polarization and multi-frequency manner.

FIG. 20 shows the thirteenth embodiment of an ESMR constructed according to the present invention. The twelfth embodiment is different from the first embodiment in that the radiation elements $1x$ are in the form of an element operable through multiple polarization and frequency. The description relating to the first embodiment can also be applied to the twelfth embodiment except for the above difference and other associated differences. As will be apparent, the thirteenth embodiment is a combination of the eleventh embodiment with the twelfth embodiment. Although the details of the multiple polarization type radiation element $1x$ (which is operable through multiple polarization and frequency) will be omitted, they will be apparent for a person skilled in the art.

Since each of the radiation elements $1x$ is in the form of a multiple polarization and frequency type element, the thirteenth embodiment comprises a frequency selector 10 at the post-stage of the sub-array selection switch 7 and a plurality of polarization selectors at the post-stage of the frequency selector 10. The polarization selectors are provided one for each frequency. Since two frequencies are assumed in FIG. 20, there are two polarization selectors $9a$ and $9b$. The frequency selector 10 separates the received signals supplied through the sub-array selection switch 7 into the respective frequencies. Each of the polarization selectors $9a$ and $9b$ separates the received signals having frequencies corresponding to the polarization selector for every polarization. The thirteenth embodiment comprises sets of low noise receiver and integrator units each of which is provided for the corresponding combination of frequency and polarization received by the corresponding radiation element $1x$. FIG. 20 shows four sets of receiver and integrator units ($4a$, $5a$; $4b$, $5b$; $4c$, $5c$ and $4d$, $5d$) since it is assumed that two different frequencies and two different polarizations are used in the thirteenth embodiment. The signals separated by the polarization selectors $9a$ and $9b$ are processed and supplied to the signal processor 6 by the respective sets of receiver and integrator units in the same manner as in the first embodiment. The signal processor 6 processes the results of integration for each set of frequency and polarization in the same manner as in the first embodiment.

Thus, the thirteenth embodiment can provide an ESMR capable of operating through multiple frequency and polarization. Although it has been assumed in the above description that the receiving antenna 1 is in the form of a cylindrical one-dimensional phased-array antenna, the receiving antenna 1 may be replaced by any other type antenna as long as it can perform the conical scan and includes radiation elements $1x$ operable through multiple frequency and polarization, for example, by such an antenna as shown in FIG. 6, 8, 9, 10, 12, 14 or 15. The operation made in such a case will be understood with reference to the description relating to the second to eighth embodiments.

Fourteenth to Twenty-sixth Embodiments

Figure 21:
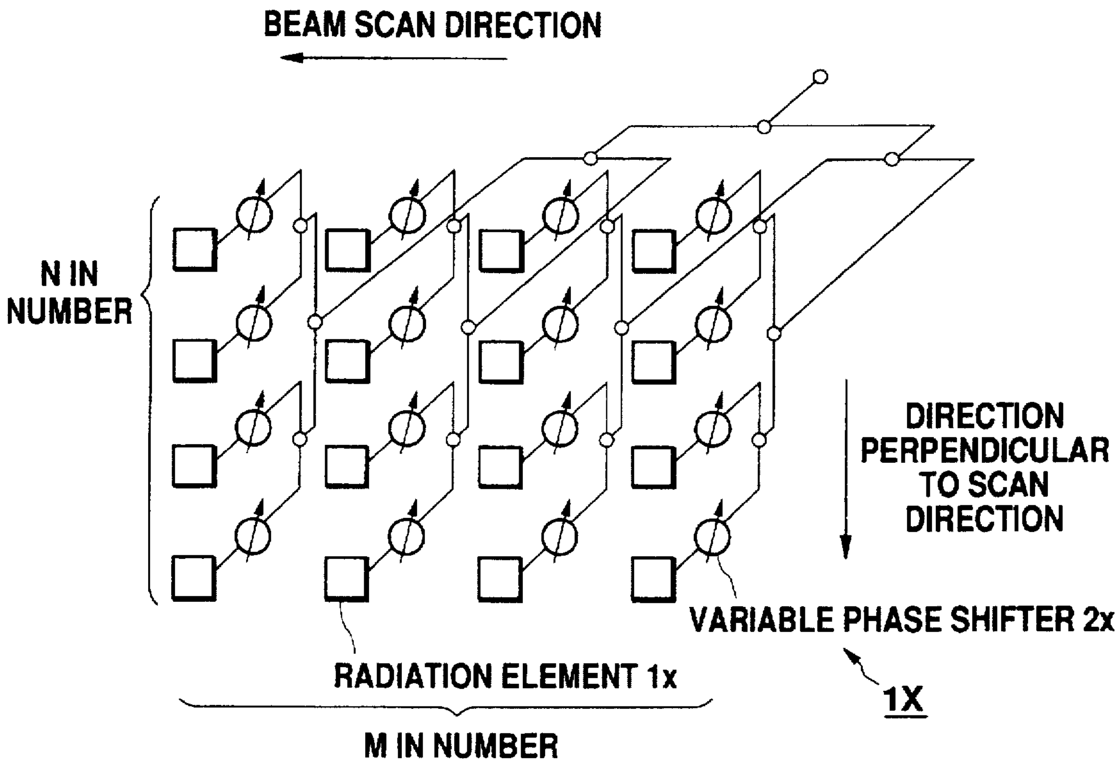
FIG. 21 is a view of the configuration of sub-arrays forming a two-dimensional phased-array antenna according to any one of the fourteenth to thirtieth embodiments of the present invention.

FIG. 21 shows a configuration of sub-arrays 1X in an ESMR constructed according to the fourteenth to twenty-sixth embodiments of the present invention. The fourteenth to twenty-sixth embodiments are different from the first to thirteenth embodiments in that the sub-arrays 1X are configured in such a manner as is shown in FIG. 21. The description relating to the first to thirteenth embodiments can also be applied to the fourteenth to twenty-sixth embodiments except for the above difference and other associated differences.

As shown in FIG. 21, a variable phase shifter $2x$ is provided for each of the radiation elements $1x$. Therefore, the direction of beam in each of the sub-arrays 1X can be changed two-dimensionally by causing the phase-shift controller 3 to control the phase-shift in the corresponding one of the variable phase shifters $2x$. Although the configuration of FIG. 2 can steer the beam for each sub-array 1X only in the scan direction, the configuration of FIG. 21 can also steer the beam in the direction perpendicular to the scan direction. Therefore, it can be said that the fourteenth to twenty-sixth embodiments provide a two-dimensional phased-array antenna in such a configuration that the sub-arrays 1X can steer the beams two-dimensionally and electronically. The receiving antenna 1 used can be called a cylindrical two-dimensional phased-array antenna since it is in the form of a cylindrical phased-array antenna formed by two-dimensional phased-array antennas.

Thus, the fourteenth to twenty-sixth embodiments can change the incident angle of beams onto the surface of the earth or another planet in addition to provision of the same advantages as in the first to thirteenth embodiments. In other words, the fourteenth to twenty-sixth embodiments can change the incident angle by steering the beam of each of the sub-arrays 1X along the direction perpendicular to the scan direction.

Twenty-seventh Embodiment

Figure 22:
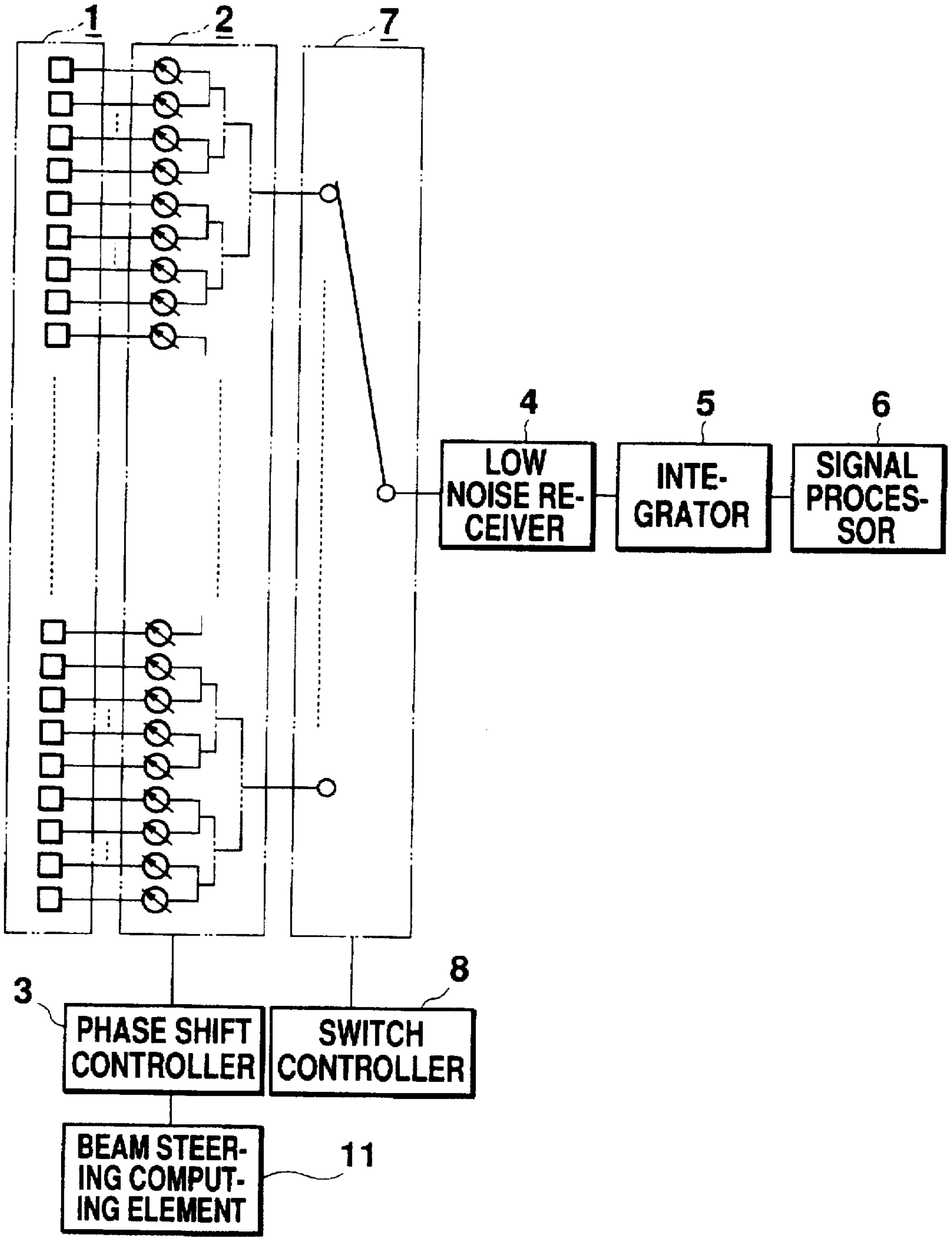
FIG. 22 is a block diagram of an ESMR which is constructed according to the twenty-seventh embodiment of the present invention and which can stare at a particular area on the surface of the earth or another planet.

FIG. 22 shows the twenty-seventh embodiment of an ESMR constructed according to the present invention. The twenty-seventh embodiment is different from the first embodiment in that a beam steering computing element 11 is provided to effect a detailed observation mechanism. The description relating to the first embodiment can also be applied to the twenty-seventh embodiment except for the above difference and another associated differences.

The beam steering computing element 11 gives a command relating the beam steering of each of the sub-arrays 1X to the phase-shift controller 3 such that more information can be obtained from a particular area on the surface of the earth or another planet. The phase-shift controller 3 is responsive to such a command to steer the beam from the corresponding sub-array 1X. When the particular area on the surface of the earth or another planet is observed intently by the receiving antenna 1 in such a manner, the integration time $\tau$ with respect to that particular area can be prolonged through the formula (2). As a result, the particular area can be measured with an improved temperature resolution $\Delta T$.

If the switch controller 8 maintains the sub-array selection switch 7 constant during the detailed observation, the detailed observation can be continuously accomplished over a relatively long time period. On the contrary, if the switch controller 8 switches the sub-array selection switch 7 as in the first embodiment even during the detailed observation step, the detailed observation can be performed intermittently be. The layout of FIG. 22 may be applied to the third and eleventh to thirteenth embodiment.

Twenty-eighth Embodiment

Figure 23:
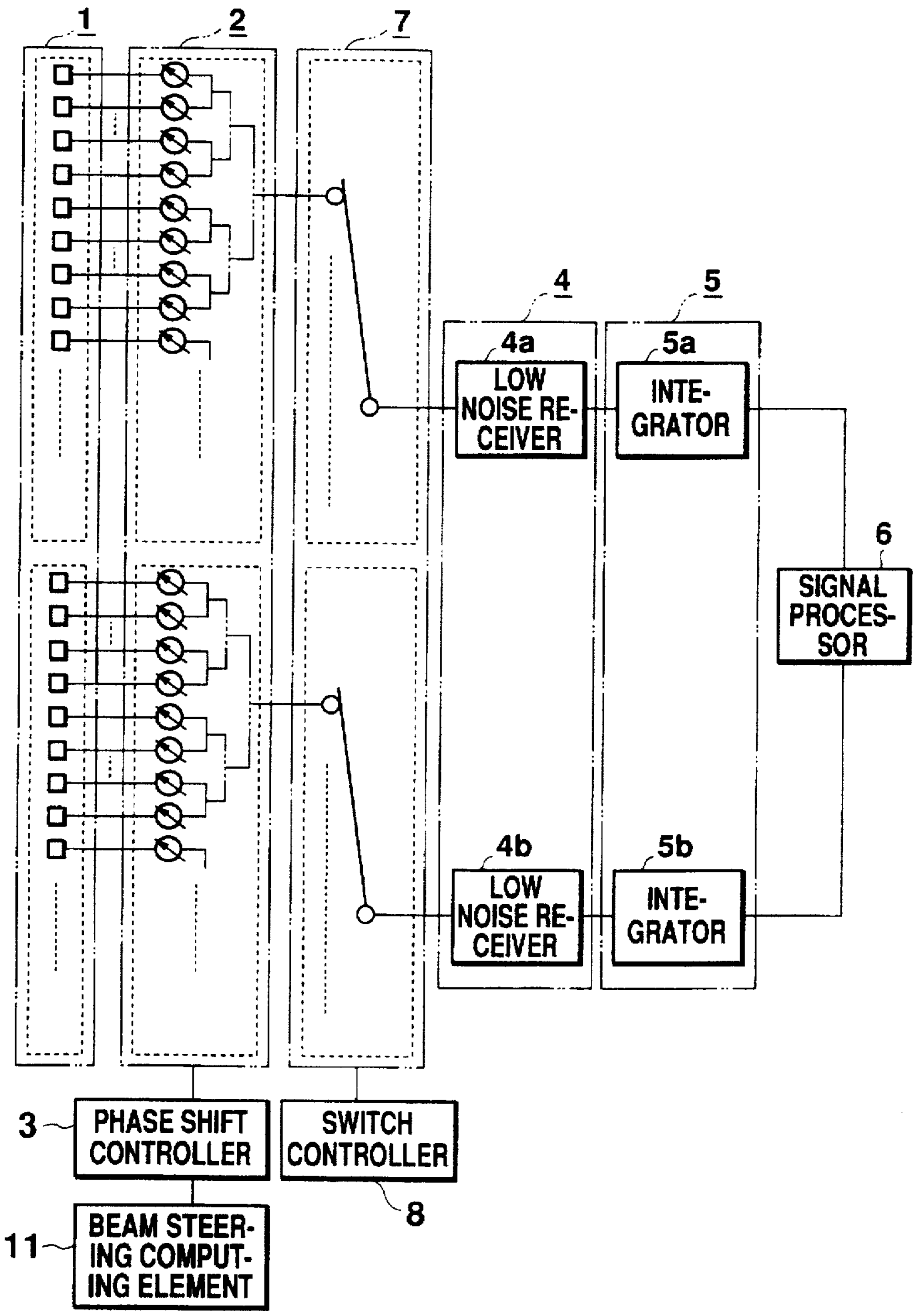
FIG. 23 is a block diagram of an ESMR which is constructed according to the twenty-eighth embodiment of the present invention and which can stare at a particular area on the surface of the earth or another planet.

FIG. 23 shows the twenty-eighth embodiment of an ESMR constructed according to the present invention. The twenty-eighth embodiment is different from the second embodiment in that a beam steering computing element 11 is provided to effect a detailed observation mechanism. The description relating to the second embodiment can also be applied to the twenty-eighth embodiment except for the above difference and other associated differences. The operation of the twenty-eighth embodiment is similar to that of the twenty-seventh embodiment except that the number of beams to controlled is plural. Therefore, the description relating to the twenty-seventh embodiment can also be applied to the twenty-eighth embodiment except for the above difference and other associated differences. The receiving antenna 1 may be replaced by any other type of cylindrical phased-array antenna as long as it can provide a plurality of beams. In other words, the arrangement of FIG. 23 may be applied to the fourth to tenth embodiments.

Twenty-ninth Embodiment

This embodiment is different from the fourteenth embodiment in that the receiving antenna 1 is in the form of a multiplicated face type phased-array antenna. The description relating to the fourteenth embodiment can also be applied to the twenty-ninth embodiment except above difference and other associated differences. The multiplicated face type phased-array antenna is a phased-array antenna in which the sub-arrays 1X and thus radiation elements 1*x* forming them are disposed along the multiplicated face. The multiplicated face is a composite curved face which is provided by synthesizing a plurality of basic curved faces (e.g., cylindrical faces). Each of the sub-arrays 1X in the multiplicated face type phased-array antenna used in this embodiment is a two-dimensional phased-array antenna as shown in FIG. 21.

The twenty-ninth embodiment does not use such a cylindrical phased-array antenna as in the previous embodiments, but can conically scan the face of the earth or another planet through the beams of the receiving antenna 1 as in the cylindrical phased-array antenna. This is because each of the sub-arrays 1X is formed as a two-dimensional phased-array antenna. More particularly, the phase-shift controller 3 two-dimensionally steers the beam of each of the sub-arrays 1X to compensate for any difference between the be multiplicated faces and the cylindrical surface. Thus, the cylindrical face can be equivalently effected.

The receiving antenna 1 may be either of a multiplicated face type phased-array antenna formed by combining a plurality of multiplicated face type phased-array antennas, an inverse-directional multiplicated face type phased-array antenna radiating beams toward the interior of the multiplicated faces or a multiple inverse-directional multiplicated face formed by combining a plurality of inverse-directional multiplicated face phased-array antennas. Differences from the twenty-ninth embodiment which are produced when these antennas are used will be understood with reference to the description relating to the second to fourth embodiments.

The receiving antenna 1 may be any one of a multi-beam multiplicated face type phased-array antenna providing a plurality of beams from each multiplicated face type phased-array antenna, a multiple multi-beam multiplicated face type phased-array antenna formed by combining a plurality of multi-beam multiplicated face type phased-array antennas, a multi-beam type inverse-directional multiplicated face type phased-array antenna radiating a plurality of beams toward the interior of the multiplicated faces and a multiple multi-beam inverse-directional multiplicated face type phased-array antenna formed by combining a plurality of multi-beam type inverse-directional multiplicated face type phased-array antennas. Differences from the twenty-ninth embodiment which are produced when the multiple antennas are used will be understood with reference to the description relating to the fifth to eighth embodiments. The twenty-ninth embodiment may be combined with any one of the twenty-second to twenty-eighth embodiments.

Thirtieth Embodiment

Figure 24:
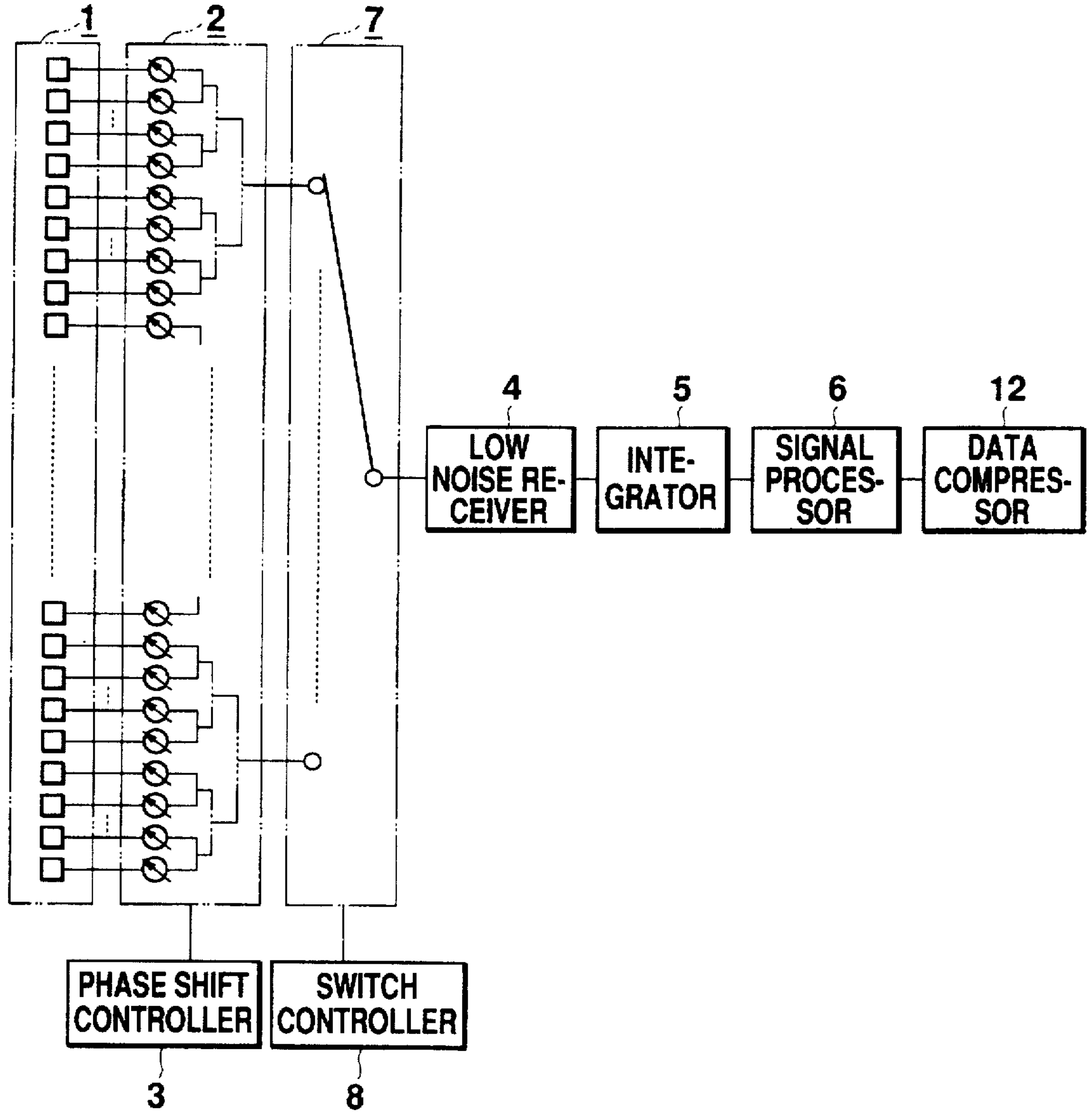
FIG. 24 is a block diagram of an ESMR which is constructed according to the thirtieth embodiment of the present invention and which can compress data to be transmitted to an earth station.
Figure 25:
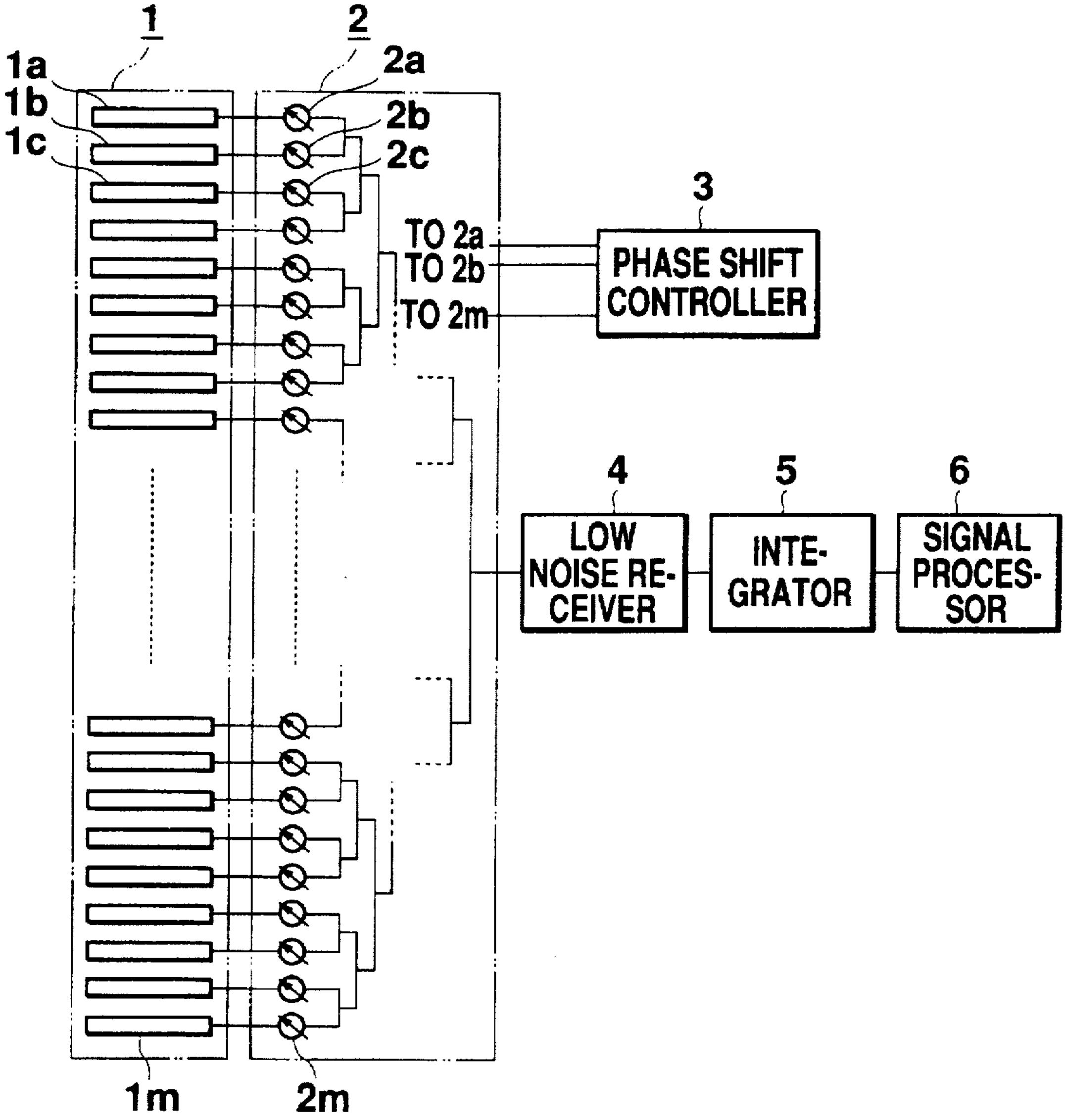
Fig. 25 PRIOR ART
FIG. 25 is a block diagram of an ESMR constructed according to the prior art.
Figure 26:
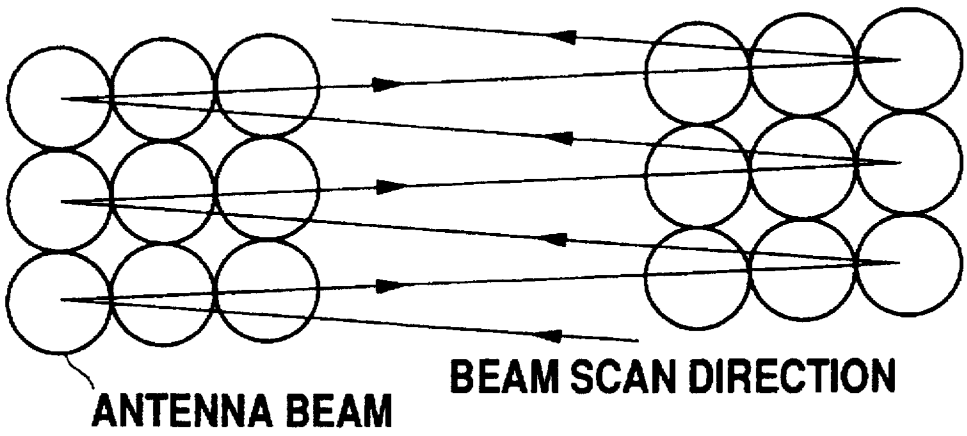
Fig. 26 PRIOR ART
FIG. 26 is a conceptual view of a scanning process according to the prior art.
Figure 27:
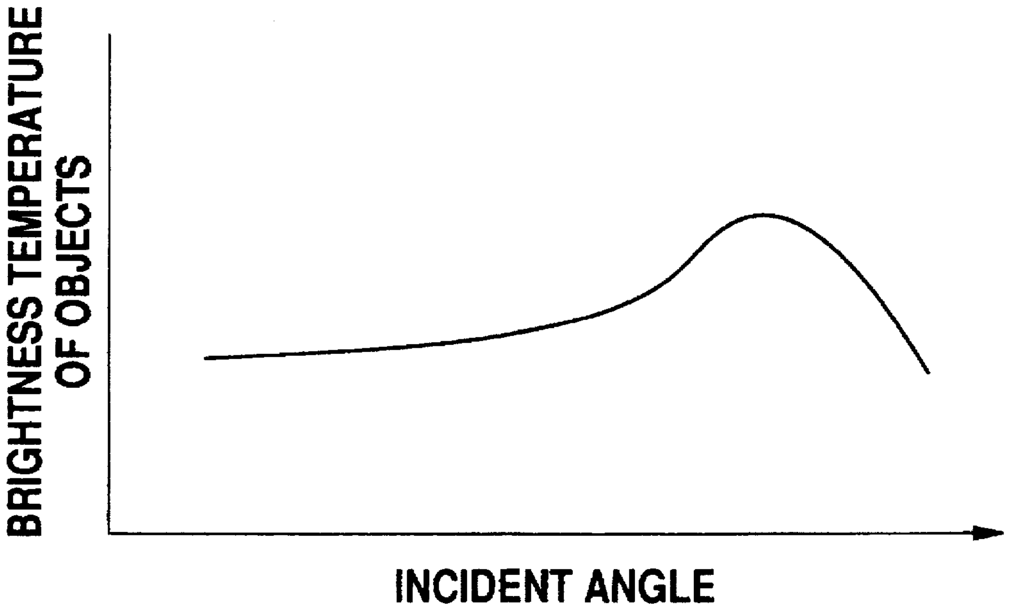
Fig. 27 PRIOR ART
FIG. 27 is a view showing how the result of measurement of the brightness temperature in the prior art varies depending on the incident angle in the ESMR.

FIG. 24 shows the thirtieth embodiment of an ESMR constructed according to the present invention. This embodiment is different from the first embodiment in that it comprises a data compressor 12 for compressing the outputs of the signal processor 6 in any suitable manner such as differential coding or the like. The description relating to the first embodiment can also be applied to the thirtieth embodiment except for the above difference and other associated differences.

Thus, the thirtieth embodiment can reduce the amount of data to be transmitted from the ESMR to the earth equipment. The arrangement of the thirtieth embodiment can be applied to any one of the second to twenty-ninth embodiments. In such a case, the description relating to the respective embodiments should be referred to.

What is claimed is:

1. An electrically scanning microwave radiometer mounted in a flying body orbiting a planet and operative to measure a surface of the planet, said electrically scanning microwave radiometer comprising:

a receiving antenna having a single radiation face a shape of which is cylindrical and is capable of scanning the surface of the planet along a conical section, the receiving antenna being constructed such that the single radiation face receives radiated energy substantially along a beam axis that extends from the radiation face to the surface of the planet;

a receiver for detecting original signals received by the receiving antenna and indicating a radiation from the planet to generate detected signals;

an integrator for integrating the detected signals to generate integrated signals; and measurement signal providing means for processing the integrated signals to generate measurement signals which indicate the result of measurement for the surface of the planet and will be provided to an earth station;

wherein said receiving antenna comprises:

a plurality of sub-arrays disposed on said single radiation face and arranged in a scan direction, each of said plurality of sub-arrays having at least one beam for receiving the radiation from the planet;

a sub-array selection switch for selecting at least one of said plurality of sub-arrays as a receiving sub-array and for supplying the radiation received by the receiving sub-array to the receiver as said original signals; and switch control means for controlling said sub-array selection switch to change the receiving sub-array sequentially in the scan direction such that the surface of said planet will be scanned along said conical section.

2. An electrically scanning microwave radiometer as defined in claim 1 wherein said switch control means is operative to change the receiving sub-array sequentially in the scan direction at a speed which is determined depending on an altitude of said flying body.

3. An electrically scanning microwave radiometer as defined in claim 1 wherein the switch control means is operative to change the receiving sub-array sequentially in the scan direction at a speed lower than a speed which is determined depending on an altitude of said flying body.

4. An electrically scanning microwave radiometer as defined in claim 1 wherein said switch control means is operative to change the receiving sub-array sequentially in the scan direction at a speed higher than a speed which is determined depending on an altitude of said flying body.

5. An electrically scanning microwave radiometer as defined in claim 1 wherein each of said plurality of sub-arrays comprises:

at least one radiation element for receiving the radiation from said planet, said at least one radiation element being disposed on said radiation face;

at least one variable phase shifter coupled to the at least one radiation element, said at least one variable phase shifter being operative to shift the phase of the radiation received by the at least one radiation element; and phase-shift control means for controlling phase-shifts through said at least one variable phase shifter to generate a beam through said at least one radiation element and to steer said beam in the scan direction.

6. An electrically scanning microwave radiometer as defined in claim 1 wherein each of said plurality of sub-arrays comprises a plurality of radiation elements for receiving the radiation from said planet, said plurality of radiation elements being disposed on said radiation face and arranged on intersections of an imaginary lattice composed of rows parallel to the scan direction and columns perpendicular to the scan direction;

a plurality of variable phase shifters each provided for the corresponding one of said columns, each of said plurality of variable phase shifters being operative to combine and shift a phase of the radiation received by radiation elements belonging to the corresponding one of said columns; and phase-shift control means for controlling phase-shifts through said plurality of variable phase shifters to generate a beam through said plurality of radiation elements and to steer said beam in the scan direction.

7. An electrically scanning microwave radiometer as defined in claim 1 wherein each of said plurality of sub-arrays comprises:

a plurality of radiation elements for receiving the radiation from said planet, said plurality of radiation elements being disposed on said radiation face and arranged on intersections of an imaginary lattice composed of rows parallel to the scan direction and columns perpendicular to the scan direction;

a plurality of variable phase shifters each provided for a corresponding one of said plurality of radiation elements, each of said plurality of variable phase shifters being operative to shift a phase of the radiation received by the corresponding one of said plurality of radiation elements; and phase-shift control means for controlling phase-shifts through said plurality of variable phase shifters to generate a beam through said plurality of radiation elements and to steer said beam both in the scan direction and a direction perpendicular to the scan direction.

8. An electrically scanning microwave radiometer as defined in claim 1 wherein each of said plurality of sub-arrays comprises:

a plurality of radiation elements for receiving the radiation from said planet, said plurality of radiation elements being disposed on said radiation face and arranged in the scan direction;

a plurality of variable phase shifters each provided for a corresponding one of said plurality of radiation elements, each of said plurality of variable phase shifters being operative to shift the phase of the radiation received by the corresponding one of said plurality of radiation elements; and phase-shift control means for controlling phase-shifts through said plurality of variable phase shifters to form an isophase plane forwardly of said plurality of sub-arrays.

9. An electrically scanning microwave radiometer as defined in claim 1 wherein each of said plurality of sub-arrays has at least two beams on a plane which is perpendicular to the scan direction and wherein one set comprising said sub-array selection switch, said receiver and said integrator are provided for each beam on the plane.

10. An electrically scanning microwave radiometer as defined in claim 1 wherein at least two radiation faces each having a cylindrical shape are provided to form a composite cylindrical face, each of said plurality of sub-arrays having a beam provided for each of said radiation faces on a plane which is perpendicular to the scan direction and wherein one set comprising said sub-array selection switch, said receiver and said integrator is provided for each beam of said plurality of sub-arrays.

11. An electrically scanning microwave radiometer as defined in claim 9 wherein at least two radiation faces each having a cylindrical shape are provided to form a composite cylindrical face, each of said plurality of sub-arrays having a beam provided for each of said radiation faces on a plane which is perpendicular to the scan direction.

12. An electrically scanning microwave radiometer as defined in claim 1 wherein said at least one beam is directed outwardly from a convex surface of said radiation face.

13. An electrically scanning microwave radiometer as defined in claim 1 wherein each of said at least one beam is directed outwardly from a concave surface of said radiation face.

14. An electrically scanning microwave radiometer as defined in claim 1, further comprising means for controlling said receiving antenna to scan the surface of said planet along a plurality of partial conical sections in parallel, the plurality of partial conical sections being provided by dividing said conical section.

15. An electrically scanning microwave radiometer as defined in claim 1 wherein said receiving antenna simultaneously receives the radiation including a plurality of polarizations, one set comprising said receiver and said integrator being provided for each of said plurality of polarizations and said electrically scanning microwave radiometer further comprising polarization separation means for separating the original signals received by said receiving antenna based on a polarization of each of the original signals and for supplying separated original signals to a corresponding one of said receivers.

16. An electrically scanning microwave radiometer as defined in claim 1 wherein said receiving antenna simultaneously receives the radiation including a plurality of frequencies, one set comprising said receiver and said integrator being provided for each of said plurality of frequencies and said electrically scanning microwave radiometer further comprising frequency separation means for separating the original signals received by said receiving antenna based on a frequency of each of the original signals and for supplying separated original signals corresponding to one of said receivers.

17. An electrically scanning microwave radiometer as defined in claim 1 wherein said receiving antenna simultaneously receives the radiation including combinations of a plurality of polarizations and a plurality of frequencies, one set comprising said receiver and said integrator being provided for each of the combinations, said electrically scanning microwave radiometer further comprising polarization and frequency separation means for separating the original signals received by said receiving antenna based on a combination of a frequency and a polarization of each of the original signals and for supplying separated original signals to a corresponding one of said receivers.

18. An electrically scanning microwave radiometer as defined in claim 1, further comprising detailed observation control means for controlling said receiving antenna such that said at least one beam slowly traces a particular area on the surface of said planet.

19. An electrically scanning microwave radiometer as defined in claim 18, further comprising means for stopping scanning by said receiving antenna as said at least one beam is tracing said particular area.

20. An electrically scanning microwave radiometer as defined in claim 1 wherein said measurement signal providing means includes means for data-compressing the integrated signals.

21. An electrically scanning microwave radiometer as defined in claim 1, wherein said flying body is an artificial satellite or planetary probe, said receiver is operative to amplify said original signals before detection and said measurement signal providing means is operative to convert the integrated signals into digital signals which are in turn formatted by said measurement signal providing means.

22. An electrically scanning microwave radiometer mounted in a flying body orbiting a planet and operative to measure a surface of the planet, said electrically scanning microwave radiometer comprising:

a receiving antenna having a single radiation face a shape of which is multiplicated and is capable of scanning the surface of the planet along a conical section, the receiving antenna being constructed such that the single radiation face receives radiated energy substantially along a beam axis that extends from the radiation face to the surface of the planet;

a receiver for detecting original signals received by the receiving antenna and indicating a radiation from the planet to generate detected signals;

an integrator for integrating the detected signals to generate integrated signals; and measurement signal providing means for processing the integrated signals to generate measurement signals which indicate the result of measurement for the surface of the planet and will be provided to an earth station;

where said receiving antenna comprises:

a plurality of sub-arrays disposed on said single radiation face and arranged along a scan direction, each of said plurality of sub-arrays having at least one beam for receiving the radiation from the planet, said beam being two-dimensionally steerable both in a scan direction and a direction perpendicular to the scan direction;

a sub-array selection switch for selecting at least one of said plurality of sub-arrays as a receiving sub-array, and for supplying the radiation from the planet received by the plurality of radiation elements to the receiver as the original signals;

switch control means for controlling the sub-array selection switch; and beam control means for two-dimensionally steering the beam, said beam control means being co-operative with said switch control means to select one of the plurality of sub-arrays sequentially along the scan direction as the receiving sub-array such that the surface of the planet will be scanned along the conical section and also to steer the beam two-dimensionally.

23. An electrically scanning microwave radiometer as defined in claim 22 wherein the switch control means and the beam control means select and the receiving sub-array sequentially in the scan direction and also two-dimensionally steer said beam, at a speed determined depending in an altitude of said flying body.

24. An electrically scanning microwave radiometer as defined in claim 22 wherein the switch control means and the beam control means select the receiving sub-array sequentially in the scan direction and also two-dimensionally steer said beam, at a speed lower than a speed determined depending on an altitude of said flying body.

25. An electrically scanning microwave radiometer as defined in claim 22 wherein the switch control means and the beam control means select the receiving sub-array sequentially in the scan direction and also two-dimensionally steer said beam, at a speed higher than a speed determined depending on an altitude of said flying body.

26. An electrically scanning microwave radiometer as defined in claim 22 wherein each of said plurality of sub-arrays comprises:

at least one radiation element for receiving the radiation from said planet, said at least one radiation element being disposed on said radiation face;

at least one variable phase shifter coupled to the at least one radiation element, the at least one variable phase shifter being operative to shift a phase of the radiation received by the at least one radiation element; and phase-shift control means for controlling phase-shifts through said at least one variable phase shifter to generate a beam through said at least one radiation element and to steer said beam in the scan direction.

27. An electrically scanning microwave radiometer as defined in claim 22 wherein each of said plurality of sub-arrays comprises:

a plurality of radiation elements for receiving the radiation from said planet, said plurality of radiation elements being disposed on said radiation face and arranged on intersections of an imaginary lattice composed of rows parallel to the scan direction and columns perpendicular to the scan direction;

a plurality of variable phase shifters each provided for a corresponding one of said columns, each of said plurality of variable phase shifters being operative to combine and shift a phase of the radiation received by radiation elements belonging to the corresponding one of said columns; and phase-shift control means for controlling phase-shifts through said plurality of variable phase shifters to generate a beam through said plurality of radiation elements and to steer said beam in the scan direction.

28. An electrically scanning microwave radiometer as defined in claim 22 wherein each of said sub-arrays comprises:

a plurality of radiation elements for receiving the radiation from said planet, said plurality of radiation elements being disposed on said multiplicated face and arranged on intersections of an imaginary lattice compose of rows parallel to the scan direction and columns perpendicular to the scan direction;

a plurality of variable phase shifters each provided for a corresponding one of said plurality of radiation elements, each of said plurality of variable phase shifters being operative to shift a phase of the radiation received by the corresponding one of said plurality of radiation elements; and phase-shift control means for controlling phase-shifts through said plurality of variable phase shifters to generate beam through said plurality of radiation elements and to steer said beam both in the scan direction and the direction perpendicular to the scan direction.

29. An electrically scanning microwave radiometer as defined in claim 22 wherein each of said plurality of sub-arrays comprises:

a plurality of radiation elements for receiving the radiation from said planet, said plurality of radiation elements being disposed on said multiplicated face and arranged in a predetermined direction;

a plurality of variable phase shifters each provided for corresponding one of said plurality of radiation elements, each of said plurality of variable phase shifters being operative to shift a phase of the radiation received by the corresponding one of said plurality of radiation elements; and phase-shift control means for controlling phase-shifts through said plurality of variable phase shifters to form an isophase plane forwardly of said plurality of sub-arrays.

30. An electrically scanning microwave radiometer as defined in claim 22 wherein each of said plurality of sub-arrays has at least two beams on a plane which is perpendicular to the scan direction and wherein one set comprising said sub-array selection switch, said receiver and said integrator are provided for each of said beams.

31. An electrically scanning microwave radiometer as defined in claim 30 wherein at least two radiation faces each having a multiplicated shape are provided to form a composite multiplicated face, each of said plurality of sub-arrays having a beam provided for each of said radiation faces on a plane which is perpendicular to the scan direction.

32. An electrically scanning microwave radiometer as defined in claim 22 wherein at least two radiation faces each having a multiplicated shape are provided to form a composite multiplicated face, each of said plurality of sub-arrays having a beam provided for each of said radiation faces on a plane which is perpendicular to the scan direction and wherein one set comprising said sub-array selection switch, said receiver and said integrator is provided for each beam.

33. An electrically scanning microwave radiometer as defined in claim 22 wherein said beam is directed outwardly from a convex surface of said radiation face.

34. An electrically scanning microwave radiometer as defined in claim 22 wherein said beam is directed outwardly from a concave surface of said face.

35. An electrically scanning microwave radiometer as defined in claim 1, further comprising means for controlling said receiving antenna to scan an area of the surface of said planet more than once.

36. An electrically scanning microwave radiometer as defined in claim 22, further comprising means for controlling said receiving antenna to scan an area of the surface of said planet more than once.

37. An electrically scanning microwave radiometer as defined in claim 22, further comprising means for controlling said receiving antenna to scan the surface of said planet along a plurality of partial conical sections in parallel, the plurality of partial conical sections being provided by dividing said conical section.

38. An electrically scanning microwave radiometer as defined in claim 22 wherein said receiving antenna simultaneously receives the radiation including a plurality of polarizations, one set comprising said receiver and said integrator being provided for each of said plurality of polarizations and said electrically scanning microwave radiometer further comprising polarization separation means for separating the original signals received by said receiving antenna based on a polarization of each of the original signals and for supplying separated original signals to a corresponding one of said receivers.

39. An electrically scanning microwave radiometer as defined in claim 22 wherein said receiving antenna simultaneously receives the radiation including a plurality of frequencies, one set comprising said receiver and integrator being provided for each of said plurality of frequencies and said electrically scanning microwave radiometer further comprising frequency separation means for separating the original signals received by said receiving antenna based on a frequency of each of said original signals and for supplying separated original signals corresponding to one of said receivers.

40. An electrically scanning microwave radiometer as defined in claim 22 wherein said receiving antenna simultaneously receives the radiation including combinations of a plurality of polarizations and a plurality of frequencies, one set comprising said receiver and said integrator being provided for each of the combinations, said electrically scanning microwave radiometer frequency further comprising polarization and frequency separation means for separating the original signals received by said receiving antenna based on a combination of a frequency and a polarization of each of said original signals and for supplying separated original signals to a corresponding one of said receivers.

41. An electrically scanning microwave radiometer as defined in claim 22, further comprising detailed observation control means for controlling said receiving antenna such that said at least one beam slowly traces a particular area on the surface of said planet.

42. An electrically scanning microwave radiometer as defined in claim 41, further comprising means for stopping scanning by said receiving antenna as said at least one beam is tracing said particular area.

43. An electrically scanning microwave radiometer as defined in claim 22 wherein said measurement signal providing means includes means for data-compressing the integrated signals.

44. An electrically scanning microwave radiometer defined in claim 22 wherein said flying body is an artificial satellite or planetary probe, said receiver is operative to amplify said original signals before detection and said measurement signal providing means is operative to convert the integrated signals into digital signals which are in turn formatted by said measurement signal providing means.

45. A receiving antenna for use in an electrically scanning microwave radiometer mounted in a flying body orbiting a planet and operative to measure a face of the planet, said receiving antenna comprising:

a plurality of sub-arrays disposed on a cylindrical radiation face and arranged in a scan direction, each of said plurality of sub-arrays having at least one beam for receiving unreflected radiation substantially along a beam axis that extends from the radiation face to the planet;

a sub-array selection switch for selecting at least one of said plurality of sub-arrays as a receiving sub-array and for supplying the radiation received by the receiving sub-array to a receiver as original signals; and switch control means for controlling the sub-array selection switch to change the receiving sub-array sequentially along the scan direction to scan the surface of the planet along a conical section.

46. A receiving antenna as defined in claim 45 wherein each of said plurality of sub-arrays comprises:

a plurality of radiation elements for receiving the radiation from said planet, said plurality of radiation elements being disposed on said cylindrical radiation face and arranged on intersections of an imaginary lattice composed of rows parallel to the scan direction and columns perpendicular to the scan direction;

a plurality of variable phase shifters each provided for the corresponding one of said plurality of radiation elements, each of said plurality of variable phase shifters being operative to shift a phase of the radiation received by the corresponding one of said plurality of radiation elements; and phase-shift control means for controlling phase-shifts through said plurality of variable phase shifters to generate a beam through said plurality of radiation elements and to steer said beam both in the scan direction and a direction perpendicular to the scan direction.

47. A receiving antenna as defined in claim 45 wherein each of said plurality of sub-arrays has at least two beams on a plane which is perpendicular to the scan direction.

48. A receiving antenna as defined in claim 47 wherein at least two cylindrical radiation faces are provided to form a composite cylindrical face, each of said plurality of sub-arrays having a beam provided for each of said cylindrical radiation faces on a plane which is perpendicular to the scan direction.

49. A receiving antenna as defined in claim 45 wherein at least two cylindrical radiation faces are provided to form a composite cylindrical radiation face, each of said plurality of sub-arrays having a beam provided for each of said cylindrical radiation faces on a plane which is perpendicular to the scan direction.

50. A receiving antenna as defined in claim 45 wherein the beam is directed outwardly from a convex surface of said cylindrical radiation face.

51. A receiving antenna as defined in claim 45 wherein the beam is directed outwardly from a concave surface of said cylindrical radiation face.

52. A receiving antenna for use in an electrically scanning microwave radiometer mounted in a flying body orbiting a planet and operative to measure the surface of the planet, said receiving antenna comprising:

a plurality of sub-arrays disposed on a multiplicated radiation face and arranged in a scan direction, each of said plurality of sub-arrays having at least one beam for receiving radiation substantially along a beam axis that extends from the radiation face to the planet, said beam being two-dimensionally steerable both in a scan direction and a direction perpendicular to the scan direction;

a sub-array selection switch for selecting at least one of said plurality of sub-arrays as a receiving sub-array and for supplying the radiation received by the receiving sub-array to a receiver as original signals;

switch control means for controlling the sub-array selection switch; and beam control means for two-dimensionally steering the beam, said beam control means co-operative with said switch control means to change the receiving sub-array sequentially and to steer the beam two-dimensionally such that the surface of the planet will be scanned along the conical section.

53. A receiving antenna as defined in claim 52 wherein each of said plurality of sub-arrays comprises:

a plurality of radiation elements for receiving the radiation from said planet, said plurality of radiation elements being disposed on said multiplicated radiation face and arranged on intersections of an imaginary lattice compose of rows parallel to the scan direction and columns perpendicular to the scan direction;

a plurality of variable phase shifters each provided for the corresponding one of said plurality of radiation elements, each of said plurality of variable phase shifters being operative to shift a phase of the radiation received by the corresponding one of said plurality of elements; and phase-shift control means for controlling the phase-shifts through said plurality of variable phase shifters to generate said beams through said plurality of radiation elements and to steer said beam both in the scan direction and the direction perpendicular to the scan direction.

54. A receiving antenna as defined in claim 52 wherein each of said plurality of sub-arrays has at least two beams on a plane which is perpendicular to the scan direction.

55. A receiving antenna as defined in claim 54 wherein at least two multiplicated radiation faces are provided to form a composite multiplicated radiation face, each of said plurality of sub-arrays having a beam provided for each of said multiplicated radiation faces on a plane which is perpendicular to the scan direction.

56. A receiving antenna as defined in claim 52 wherein at least two multiplicated faces are provided to form a composite multiplicated radiation face, each of said plurality of sub-arrays having a beam provided for each of said multiplicated radiation faces on a plane which is perpendicular to the scan direction.

57. A receiving antenna as defined in claim 52 wherein said beam is directed outwardly from a convex surface of said multiplicated radiation face.

58. A receiving antenna as defined in claim 52 wherein said beam is directed outwardly from a concave surface of said multiplicated radiation face.

* * * * *